United States Patent [19]

Katsuse et al.

[11] Patent Number: 5,404,237
[45] Date of Patent: Apr. 4, 1995

[54] FERROELECTRIC LIQUID CRYSTAL DISPLAY HAVING C2U ALIGNMENT AND THE REWRITING VOLTAGE<NON-REWRITING VOLTAGE

[76] Inventors: Hirofumi Katsuse, Akebonoryo, 2613-1, Ichinomoto-cho, Tenri-shi, Nara-Ken; Takaji Numao, 1-1-302, Saidaiji, Kunimi-cho, Nara-shi, Nara-ken, Japan

[21] Appl. No.: 53,787

[22] Filed: Apr. 28, 1993

[30] Foreign Application Priority Data

Apr. 28, 1992 [JP] Japan ................. 4-110222

[51] Int. Cl.6 .................. G02F 1/1343; G02F 1/13
[52] U.S. Cl. ..................... 359/56; 359/100; 345/97
[58] Field of Search .............. 345/97; 359/56, 100

[56] References Cited

U.S. PATENT DOCUMENTS

| | | | |
|---|---|---|---|
| 4,932,758 | 6/1990 | Hanya et al. | 359/100 |
| 5,047,757 | 9/1991 | Bone et al. | 359/56 |
| 5,128,663 | 7/1992 | Coulson | 359/56 |
| 5,347,381 | 9/1994 | Shinomiya et al. | 359/78 |

FOREIGN PATENT DOCUMENTS 2165120 6/1990 Japan.
20711591 1/1991 Japan.

OTHER PUBLICATIONS

Surguy, et al. "The 'Joers/Alvey' Ferroelectric multiplexing Scheme," FLC '91.

Primary Examiner—William L. Sikes
Assistant Examiner—Ron Trice
Attorney, Agent, or Firm—David G. Conlin; John L. Welch

[57] ABSTRACT

A ferroelectric liquid crystal display for improving switching time and contrast comprising a ferroelectric liquid crystal having a C2U orientation, a negative dielectric anisotropy and driven by a rewriting voltage for turning a pixel on and off which is smaller than the non-rewriting voltage.

5 Claims, 19 Drawing Sheets

C2U

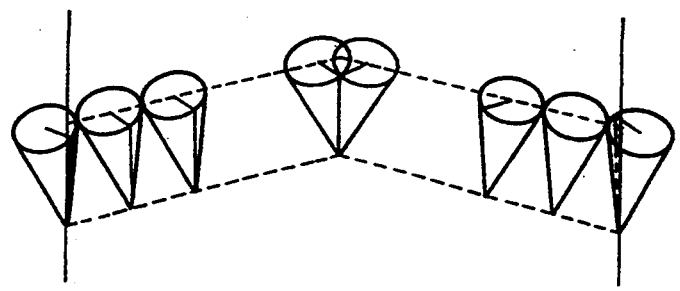
FIG. 11D  C2T
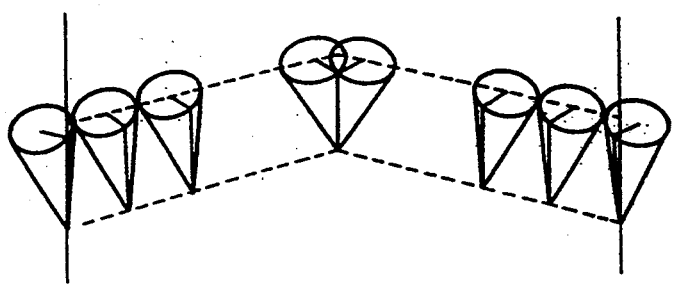
FIG. 11C  C2U
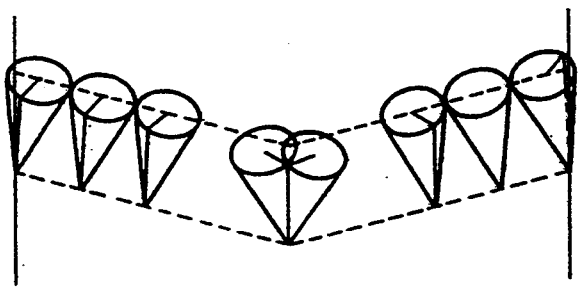
FIG. 11B  C1T
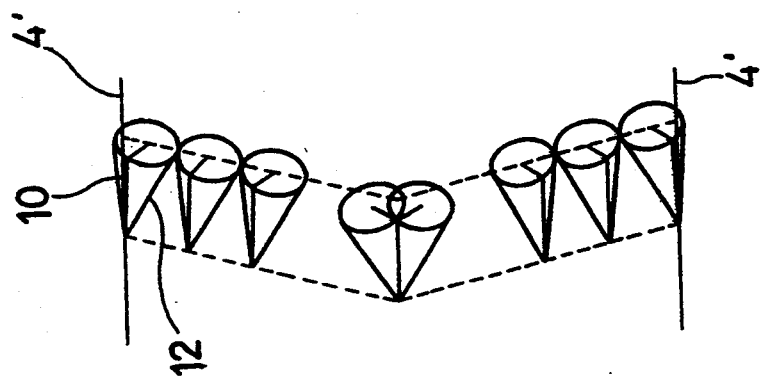
FIG. 11A  C1U

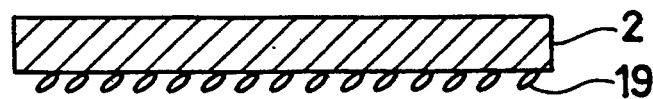
*FIG. 12A*
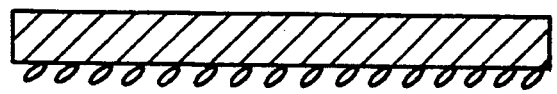
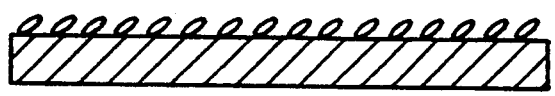
*FIG. 12B*
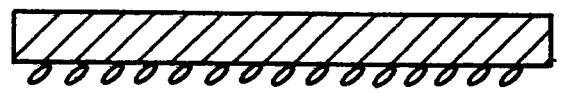
*FIG. 12C*

FERROELECTRIC LIQUID CRYSTAL DISPLAY HAVING C2U ALIGNMENT AND THE REWRITING VOLTAGE<NON-REWRITING VOLTAGE

BACKGROUND OF THE INVENTION

1. Field of The Invention

The present invention relates to a ferroelectric liquid crystal display device.

2. Description of the Related Art

Ferroelectric liquid crystals including a chiral-smectic C phase liquid crystal have an excellent characteristics such as a memory effect, a high response rate and a wide angle of view. Research has been actively conducted on an application of ferroelectric liquid crystals to display device with the most fine resolution, and the largest capacity.

At the outset, the principle of the behavior of ferroelectric liquid crystals will be detailed hereinbelow. FIG. 2(a) is a schematic representation illustrating a transfer path of a ferroelectric liquid crystal molecule FIG. 2(b) is a projection view of FIG. 2(a) as viewed from the direction shown by an arrow 8. Reference Numeral 10 designates a ferroelectric liquid crystal molecule.

The ferroelectric liquid crystal molecule is oriented parallel to substrates and has a layer structure formed in a direction perpendicular to the substrates. The ferroelectric liquid crystal molecule 10 is arranged in such a manner that it is inclined at a tilt angle $\Theta$ in a direction 13 or 15 relative to a normal line 9 of this layer. The ferroelectric liquid crystal molecule 10 exhibits a spontaneous polarization Ps with the result that the application of an electric field from the outside of the liquid crystal causes the liquid crystal to receive the force proportional to the vector product of this electric field and the spontaneous polarization Ps in a direction perpendicular to the longitudinal axis of the molecule to travel on a surface of the conical transfer path 12 with an apex angle twice as large as the tilt angle $2\Theta$. The driving force of the travel is given by the spontaneous polarization so that these kinds of ferroelectric liquid crystals exhibit a high response rate; only 1/100 or 1/1000 of that of the conventional liquid crystal using a nematic liquid crystal.

The ferroelectric liquid crystal molecule 10,14,16 is stable in two different states. It exhibits a stable state when a positive electric field E moves the molecule 10 to the axis 13 shown in FIG. 2(b) whereas it exhibits another stable state when a negative electric field moves it to the axis 15. These stable states are held unless no electric field required for the transfer of molecules are applied. In other words, the ferroelectric liquid crystal molecule has a memory properties.

Rendering either of the two stable states 14, 16, for example, the molecular axis of the stable state 14 identical to the absorption axis of the polarizing plate provides a black state impervious to light and whereas rendering the molecular is of the other stable state 16 identical to the absorption axis thereof provides a state of white color.

Operating the stable state of the molecule 10 in each pixel by matrix driving to offer a predetermined display state.

However, matrix driving results in applying a bias voltage to all the pixels, thereby producing a molecular motion to deteriorate the quality of the contrast.

In this connection, C1 uniform which generates only a small amount of light leakage because of the application the bias voltage and which reduces the deterioration of the contrast is employed as a orientational sate of the ferroelectric liquid crystal.

As other kinds of orientational sates, C1 twist and C2 uniform are known (see Ferroelectrics, 114, pp 3 (1991)), Liquid Crystal Discussion Drafts (1991, Koden), Japanese Laid-Open Patent Application No. HEI 2-165120 and the like). Both C1 twist and C2 uniform are low in contrast.

On the other hand, there has been proposed a driving method that can reduce the force unassociated with the rewriting of image applied on the liquid crystal molecule by employing a relationship between the applied voltage and the response rate seen in a ferroelectric liquid crystal having a dielectric anisotropy of less than 0 wherein a specific voltage applied minimizes the response rate while voltages on both sides of the specific voltage increases the response rate (see Japanese Laid-Open Patent Application No. SHO 62-56933/1987 and Japanese Laid-Open Patent Application No. HEI 1-24234/1989). The method will be detailed hereinafter.

A force applied to the ferroelectric liquid crystal stand proportional to the force generated by the spontaneous polarization Ps, a difference $\Delta\epsilon$ in dielectric potential between the longitudinal axis and the transverse axis and the second power of the electric field E. In other words, the force E that works in the direction of the transverse axis is represented by the following equation (1):

$$F = K_0 \times Ps \times E + K_1 \times E^2 \times \Delta\epsilon \quad (1)$$

(where $K_0$ and $K_1$ represent proportional constants)

The force F is in inverse proportion to the response rate.

FIG. 4 shows a relationship between the electric field E and the response rate of the liquid crystal with $\Delta\epsilon < 0$ as disclosed in Japanese Laid-Open Patent No. HEI 1-24234/1989. As shown in FIG. 4, the response rate is minimized in the vicinity of 30 V. Since the effect of $K_0 \times Ps \times E$ item is sufficiently larger than the effect of $K_1 \times E^2 \times \Delta\epsilon$ in a region where the anisotropy working on the ferroelectric liquid crystal having $\Delta\epsilon$ less than 0 exhibits a small effect in the range of up to less than 30 V, the force F increases and the response rate decreases while the voltage increases. On the other hand, since $K_1 \times E^2 \times \Delta\epsilon$ item becomes large in a region where the anisotropy working on the ferroelectric liquid crystal exhibits a large effect at voltage larger than 30 V, the force F decreases and the response rate increases along with the increase in the voltage.

Japanese Laid-Open Patent Application No. HEI 1-24234 proposes a driving method using the above relationship as follows. FIG. 5 is a graph illustrating a waveform of the driving voltage in accordance with the present invention. In the graph, Reference Numerals (1) and (2) designate a voltage waveform applied to the scanning electrode L, (1) representing a select voltage waveform, (2) representing a nonselect voltage waveform. Numerals (3) and (4) in FIG. 5 designate a voltage waveform applied to the signal electrode S, (3) representing black rewriting voltage waveform (4) representing white rewriting voltage waveform. Numerals (5)

through (8) in FIG. 5 designates a voltage waveform applied to a pixel when (1), (2), (3) and (4) are combined.

Rewriting a white state of the liquid crystal constituting a pixel $A_{ij}$ at the crossing points of the electrodes as shown in FIG. 3 into a black state involves the application of a voltage waveform shown by (3) in FIG. 5 to a signal electrode $S_j$ upon applying a voltage waveform shown by (1) in FIG. 5 to a scanning electrode $L_i$, and the application of a voltage waveform shown by (5) in FIG. 5 to the pixel $A_{ij}$. Rewriting the black state of the liquid crystal constituting a pixel $A_{ij}$ into the white state involves the application of the voltage waveform shown by (4) in FIG. 5 to the signal electrode $S_j$ upon applying the voltage waveform shown by (1) in FIG. 5 and the application of a voltage waveform shown by (6) in FIG. 5 to the pixel $A_{ij}$. With respect to the other pixel $A_{kj}$, a voltage waveform shown by (2) in FIG. 5 is applied to a scanning electrode $L_k$ whereas, a voltage waveform shown by (3) or (4) in FIG. 5 to a signal electrode $S_1$ as a result. A voltage waveform shown by (7) or (8) in FIG. 5 is applied to these pixels so as not to change in the display of the pixel.

What is important about this method for driving the liquid crystal is that the absolute value of voltages $-V_a$, $V_a$ shown by (5) or (6) in FIG. 5 is given as a voltage in the vicinity of 30 V at which the response rate exhibits the minimum value shown in FIG. 4 whereas the absolute value of $-V_a-2V_b$, $V_a+2V_b$ is given as a voltage sufficiently larger than 30 V. With the condition of dielectric anisotropy of $\Delta\epsilon<0$ given, the force working on liquid crystal molecules with the former voltage becomes larger than the force working on liquid crystal molecules with the latter voltage, the boundary between the two voltages being placed around 30 V with the result that display is not rewritten at the latter voltage. Besides, with an increase in the latter voltage unassociated with the rewriting of images, the force working on the liquid crystal molecule in the direction of the transverse axis reduces to inhibit the molecular motion of the liquid crystal, thereby actualizing a high contrast.

"The JOERS/ALVEY Ferroelectric Multiplexing Scheme" reported by P. W. H. Surguy et al. at FLC '91 describes this method. FIG. 8 shows a driving voltage waveform in another method. The driving method involves rewriting one screen in two fields, applying a driving voltage waveform shown in FIG. 8(a) in the first field and applying a driving voltage waveform shown in FIG. 8(b) in the second field. In this method, Numeral (4) in FIG. 8 designates a voltage waveform applied to the signal electrode S, indicating a holding voltage waveform unassociated with the rewriting process. Other Numerals (1) through (8) in FIG. 8 designates the voltage waveform same as shown in FIG. 5.

Rewriting pixel $A_{ij}$ from the white state into the black state involves the application of a rewriting voltage for generating the black state as shown by (3) in FIG. 8(a) to a signal electrode $S_j$ upon applying a select voltage shown by (1) in FIG. 8(a) to a scanning electrode $L_i$ in the first field and applying the voltage waveform shown by (5) in FIG. 8(a) to the liquid crystal molecules constituting the pixel, thereby rewriting the pixel into the black state. In the second field, a select voltage shown by (1) in FIG. 8 (b) to a scanning electrode $L_i$ while applying the holding voltage shown by (4) in FIG. 8(b) followed by applying the voltage waveform shown by (6) in FIG. 8(b) to the liquid crystal molecules constituting pixel $A_{ij}$ to hold the black state. The pixel is rewritten to the white state.

Rewriting pixel $A_{ij}$ from the black state into the white state involves applying the holding voltage shown by (4) in FIG. 8(a) to a signal electrode $S_j$ upon applying a select voltage shown by (1) in FIG. 8(a) to a scanning electrode $L_i$ in the first field to apply the voltage waveform shown by (6) in FIG. 8(a) to the liquid crystal molecules constituting pixel $A_{ij}$ holding the black state at the outset. In the second field, the voltage waveform shown by (5) in FIG. 8(b) is applied to a signal electrode $S_j$ upon applying a select voltage shown by (1) in FIG. 8(b) to apply the rewriting voltage shown by (3) in FIG. 8(b) for generating the white state to a signal electrode $S_j$, thereby applying the voltage waveform shown by (5) in FIG. 8(b) to the liquid crystal molecules constituting pixel. $A_{ij}$ to rewrite the pixel into the white state.

With respect to the other pixel $A_{ij}$ ($k \neq i$), in the first field, a non-select voltage shown by (2) in FIG. 8(a) is applied to a scanning electrode $L_i$ whereas the voltage waveform shown by (3) or (4) in FIG. 8(a) is applied to a signal electrode $S_j$, thereby applying the voltage waveform shown by (7) or (8) in FIG. 8(a) to the liquid crystal molecules constituting pixel $A_{ij}$. In the second field upon applying the non-select voltage waveform shown by (2) in FIG. 8(b) to the voltage waveform shown by (3) or (4) in FIG. 8(b) is applied to the signal electrode $S_j$ to apply the voltage waveform shown by (7) or (8) in FIG. 8(b) to the liquid crystal molecules constituting pixel $A_{ij}$. At this point, application of either of the above voltage does not cause a change in the display of pixel $A_{ij}$. What is important about this method for driving the liquid crystal is that the absolute value of voltages $-V_s+V_d$, or $V_s-V_d$ shown by (5) in FIG. 8(a) or (5) in FIG. 8 is given as a voltage in the vicinity of 40 V at which the response rate exhibits the minimum voltage shown in FIG. 6(a) whereas the absolute value of $-V_s-V_d$m, $V_s+V_d$ (FIG. 8(a)(6), FIG.(b)(6)) is given as a voltage sufficiently larger than 40 V. With a condition of dielectric anisotropy of $\Delta\epsilon<0$ given, the force working on liquid crystal molecules with the former voltage becomes larger than the force working on liquid crystal molecules with the latter voltage, the boundary between the two voltages being placed around 40 V with the result that the display is not rewritten at the latter voltage. Besides, with an increase in the latter voltage unassociated with the rewriting of images, the force working on liquid crystal molecules in the direction of the transverse axis reduces to inhibit the molecular motion of the liquid crystal, thereby actualizing a high contrast.

In addition, prior to the application of the rewriting voltage $-V_s+V_d$ or $V_s-V_d, -V+V_d$ and $-V_d$ or $V_s-V_d$ and $V_d$ having same polarity, either voltage $-V_d$ or $V_d$ both are applied to reduce the rewriting voltage $-V_s+V_d$ or $V_s-V_d$ as liquid crystal molecules are placed in a state of easily accepting the rewriting process.

It naturally follows from the above discussion that driving a liquid crystal display device using a ferroelectric liquid crystal having a dielectric anisotropy ($\Delta\epsilon$) of less than 0 with the above driving method results in an improvement of the contrast and it is further expected that using C1 uniform further improves the contrast.

However, a ferroelectric liquid crystal actually manufactured with the above construction did not offer a high contrast as had been expected.

Far from offering a high contrast, it could not provide a favorable switching.

Thus, an examination was made on the cause for such result of failing in offering a high contrast and favorable switching with the result that it has been made clear that C1 uniform is not favorable for the above driving method and that a plurality of orientations are contaminated in one pixel. For example, FIG. 9 is a view illustrating an orientation of the liquid crystal material SCE-8 (manufactured by E Merck) used in a ferroelectric liquid crystal device having a cell width of 2 μm subjected to the parallel rubbing as observed under a polarizing microscope. Driving the liquid crystal with the driving method published by P. W. H. Surguy et al. has clarified the presence of three portions, portion A exhibiting a favorable contrast, portion B exhibiting a contrast of 5 or less, portion C exhibiting no switching.

In view of the above, an object of the present invention is to provide a ferroelectric liquid crystal display device with a high contrast by optimizing a combination of the orientational sate and with unified orientation in whole pixels the driving method using a relationship between the applied voltage and the response rate as can be seen in a ferroelectric liquid crystal display device having a dielectric anisotropy of less than 0.

SUMMARY OF THE INVENTION

The present invention provides a ferroelectric liquid crystal display device for improving switching time and a contrast comprising:
- a first substrate:
- a first electrode laminated on the first substrate;
- a first aligning film laminated further on the first electrode, the first aligning film being subjected to a uniaxial orientation treatment;
- a second substrate disposed opposite to the first substrate,
- a second electrode laminated on the second substrate,
- a second aligning film laminated further on the second electrode, the second aligning film being subjected to a uniaxial orientation treatment;
- a ferroelectric liquid crystal disposed between the first and the second aligning films,
- the first electrode forms a plurality of scanning electrodes, the second electrode forms a plurality of signal electrode arranged in such a manner that they intersect the scanning electrodes, a portion formed by the intersection of the scanning electrodes and the signal electrodes constitutes a pixel, and
- a driving means for driving the pixel; wherein the driving means applies to the pixel for rewriting the display a rewriting voltage capable of turning on and off the liquid crystal molecule in a minimum time or a voltage in the vicinity thereof while applying a non-rewriting voltage larger than the rewriting voltage to the pixel unassociated with the rewriting process, the first and the second aligning film have the same pretilt angle with a direction opposite to each other, the ferroelectric liquid crystal has a dielectric anisotropy of 0 or less, a smectic liquid crystal and C2U orientation.

The present invention also provides a ferroelectric liquid crystal having a pretilt angle of 5° to 10° respectively.

Preferably, the dielectric anisotropy of the above ferroelectric liquid crystal ranges −1 or less and spontaneous polarization (hereinafter abbreviated as Ps) ranges 10 nC/cm$^2$ or less.

Still preferably, the driving means apply to the pixel 20% larger voltage for non-rewriting than the voltage for rewriting.

BRIEF DESCRIPTION OF THE DRAWINGS

The present invention will be detailed in connection with the accompanying drawings in which:

FIGS. 11A, 11B, 11C and 11D are is a view illustrating an orientational state of the ferroelectric liquid crystal.

FIGS. 12a, 12b and 12c are a view illustrating the direction of a pretilt angle on the interface of the aligning film on the ferroelectric liquid crystal.

DETAILED DESCRIPTION OF THE PREFERRED EXAMPLES

Figure 1:
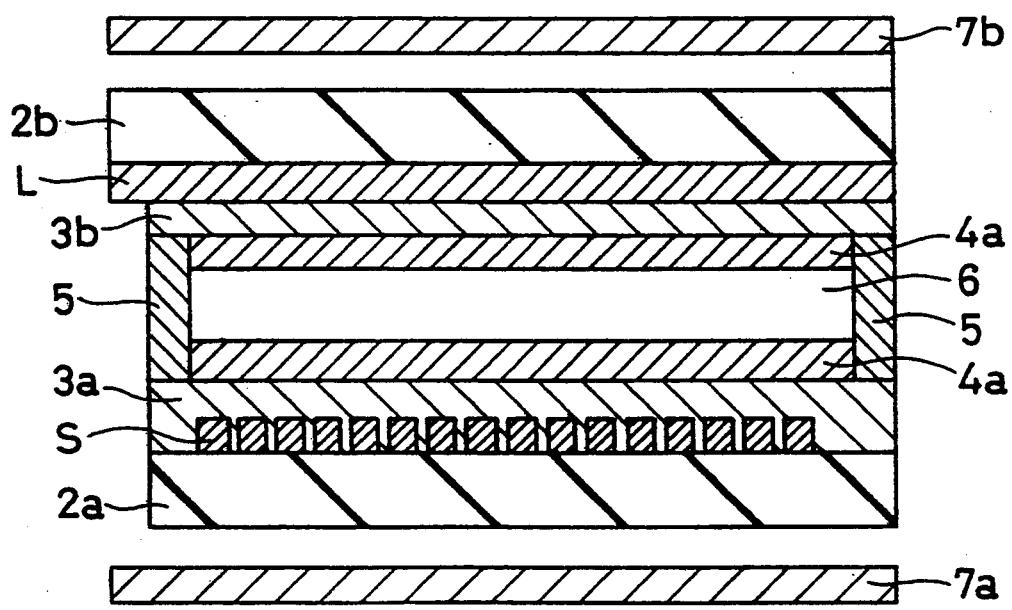
FIG. 1 is a sectional view of a ferroelectric liquid crystal display device embodying the present invention.
Figure 2A:
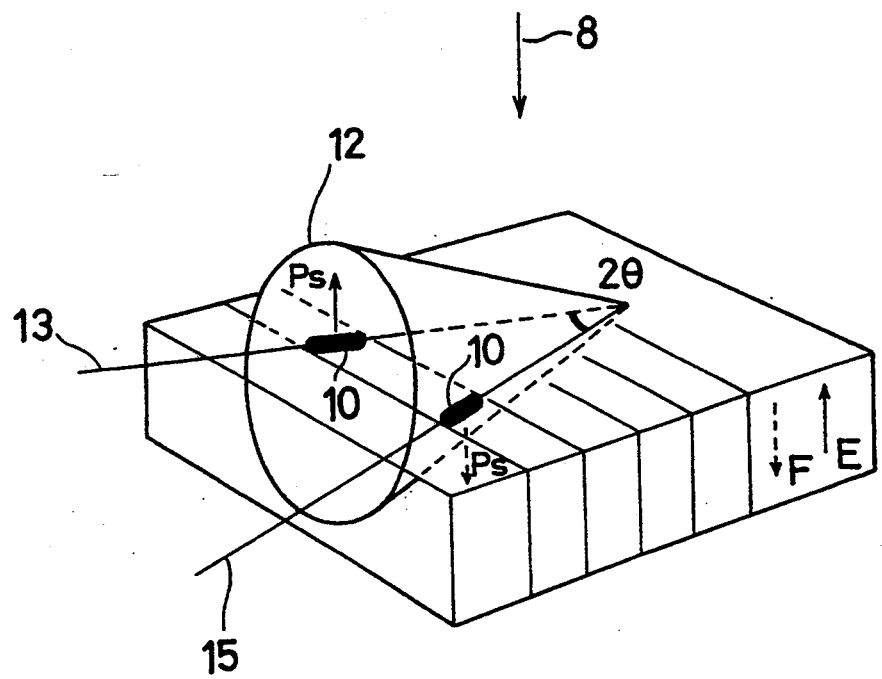
FIGS. 2A and 2B are a projection view (b) of a diagrammatic view (a) illustrating a transfer path of the ferroelectric liquid crystal molecule.
Figure 2B:
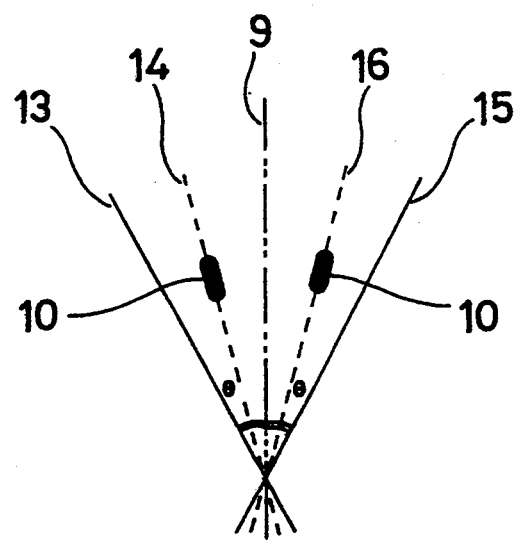

The present invention provides a ferroelectric liquid crystal display device having an orientation that permits a favorable contrast at a low driving voltage and on the entire surface thereof.

As a substrate of the present invention, an insulating inorganic substrate pervious to light is used. A glass substrate is normally used therein. The first and the second substrates are provided respectively a first and a second transparent electrode formed of an electrically conductive thin fill such as $InO_3$, $SnO_2$ and ITO. The first transparent electrode forms a scanning electrode whereas the second transparent electrode forms a signal electrode. The electrode comprises a plurality of transparent linear patterns. The scanning electrode and the signal electrode are arranged in a direction in which the linear patterns on both electrodes run at right angle to each other.

On the transparent electrode is voluntarily formed an insulating film. As the insulating film can be used inorganic thin films such as tantalum oxide, niobium oxide, $SiO_2$, $SiN_x$, or $Al_2O_3$ as well as organic films such as polyimide, photoresist resin, or polymer liquid crystals. When the insulating film is formed of an inorganic thin film, the fill can formed with such methods as anode oxidation, vapor deposition, sputtering, chemical vapor deposition (CVD) or liquid coating. When the insulating film is formed of an organic thin film, the film can be formed by using a solution containing a dissolved organic substance or a precursor solution thereof to coat the transparent electrode on the substrate with the solution with such method as spinner coating, dip coating, screen printing, or roll coating, followed by curing the coated film at a predetermined curing conditions (such as heating and light curing application). The film can be formed with such methods as CVD or Langumuir-Blodgett (LB).

On the signal electrode and the scanning electrode, or on the insulating film voluntarily formed on the electrodes, a first and a second aligning films are formed. As the aligning films, either an inorganic layer or an organic layer can be used. When inorganic layer is used as the aligning film, tilted vapor deposition of silicon oxide is favorable. Besides, such methods as rotating vapor deposition can be used. When the organic film is used as the aligning film, nylon, polyvinyl alcohol, or polyimide can be used. Usually the aligning film is subjected to a rubbing process to provide an orientation. Besides, it is possible to perform the orientation process by using a polymer liquid crystals and LB films, or by using such method as the magnetic orientation method, or the spacer edge method. It is also possible to perform orientation processing by subjecting $SiO_2$ and $SiN_x$ or the like to vapor deposition followed by a rubbing process.

The above pretilt angle is defined as an angle formed between the substrate surface and the liquid crystal molecule for the sake of convenience of discussion. That is because the aligning film has a fine protuberances and recesses. Besides, the size of the angle is defined as an a degree of inclination from the inner side of the substrate surface. The pretilt angle of the invention can be changed by subjecting the aligning film to rubbing process, or subjecting the silicon oxide to tilted vapor deposition, followed by treating the film or the substrate with a vertical orienting agent such as N,N-octadecyl-3-aminopropyltrimethoxysilyl chloride (DMOAP). In the rubbing treatment, the pretilt angle can be modified by changing the kind of cloth used for rubbing, and the rotation velocity of the roller. Besides, the angle can be controlled by the angle of depositing silicon oxide and the thickness of the deposition under the vapor deposition conditions.

Besides, the fact that the pretilt angles are directed opposite to each other means that, for example, as shown in FIG. 12(a) when the pretilt angle of the molecule 19 relative to the first aligning film has clockwise with respect to the substrate 2, the counterpart of the second aligning film relative to the same has counterclockwise with respect to the substrate 2 so that the two angles are directed opposite to each other.

A smectic liquid crystal with a chevron structure having a dielectric anisotropy of less than 0 is formed by appropriately mixing. In addition to SCE-8, SCE-12, ZLI-3234B, ZLI-4851/000, ZLI5-014/000 (all manufactured by Merck Co., Ltd. ) or the like, compounds (1) through (6) are represented by the following formulae (I) and (II) or the like:

[Chemical Formula I]

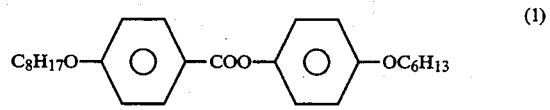
(1)

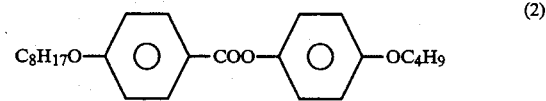
(2)

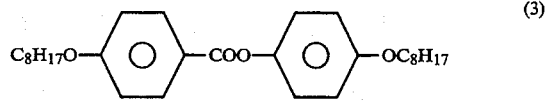
(3)

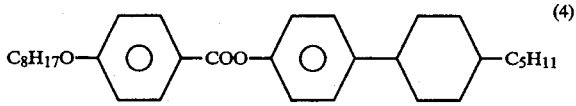
(4)

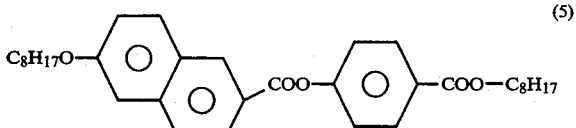
(5)

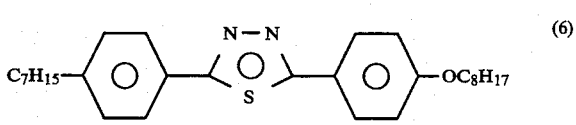
(6)

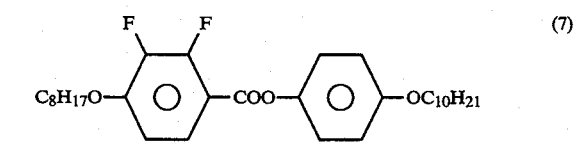
(7)

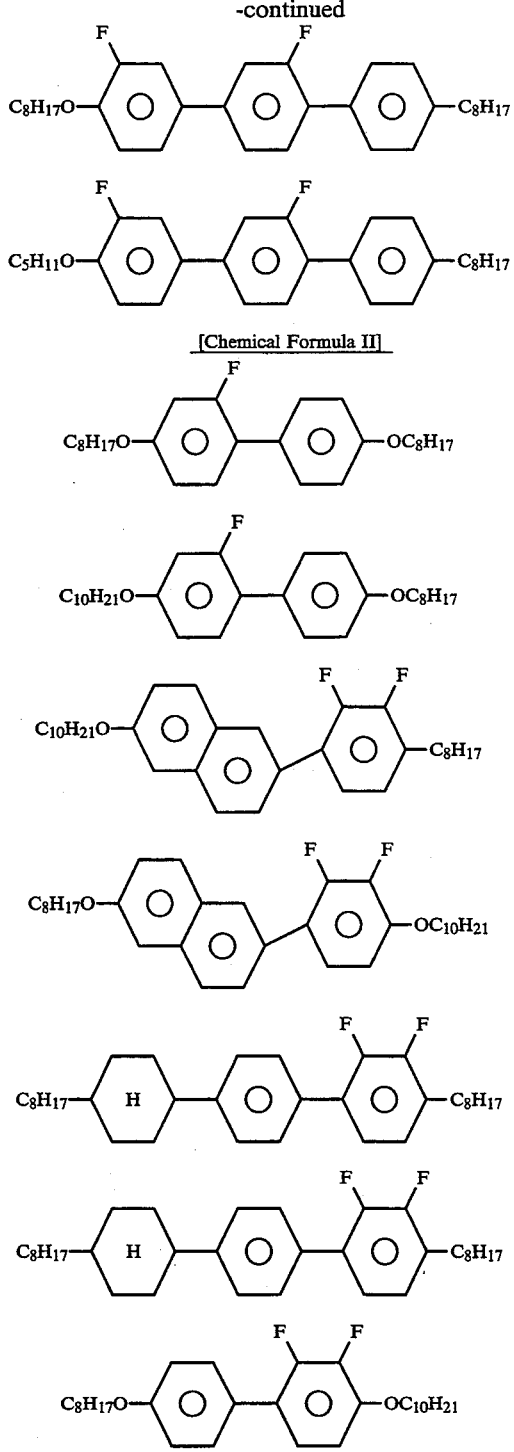

After disposing the above liquid crystal, a liquid crystal cell is formed by sealing the disposing port with epoxy curing resin. Besides, depending upon the situation, polarizing plates are arranged both above and below the liquid crystal cell in such a manner that the polarizing axes of the two polarizing plates run approximately at right angle to form a ferroelectric liquid crystal device by rendering one of the polarizing axes identical to one of the optical axes of the liquid crystal.

Next, C2U orientation is described.

Figure 10:
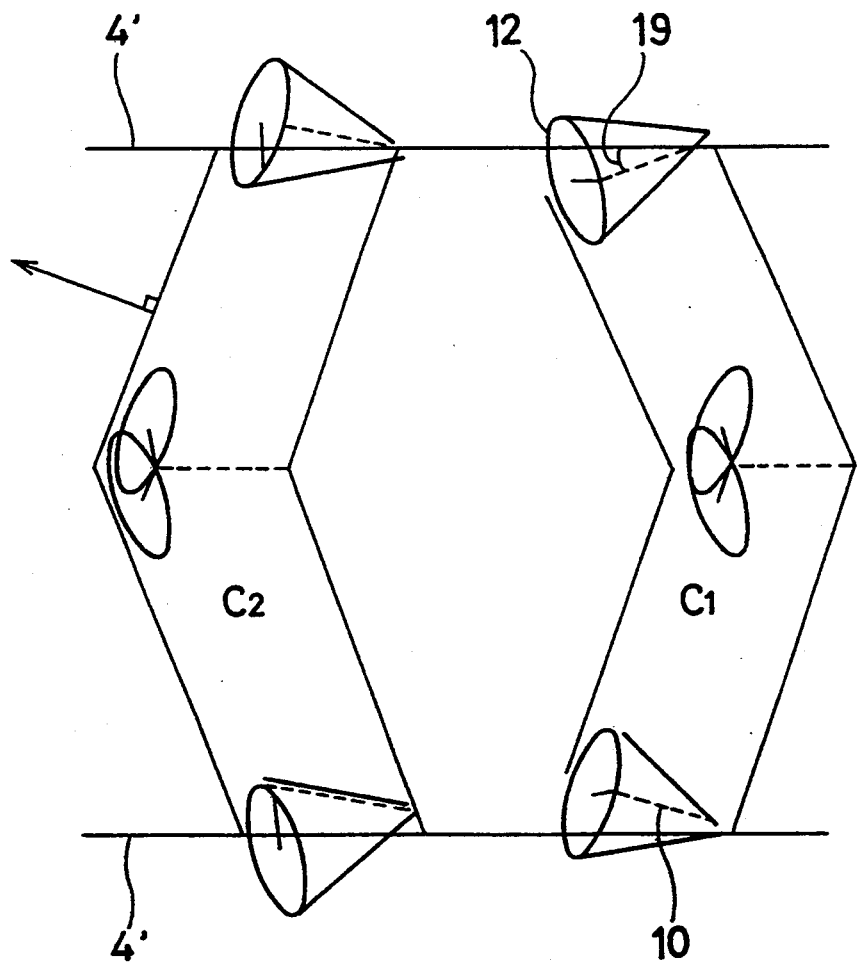
FIG. 10 is a view illustrating a layer structure of the ferroelectric liquid crystal.

FIG. 10 is a sectional view of the ferroelectric liquid crystal illustrating the structure thereof. Referring to FIG. 10, Reference Numeral 4' designates an interface of the aligning film, 10 a liquid crystal molecule, 12 a transfer path of the molecule and 19 pretilt.

Kanbe et al. named in page 3 Ferroelectrics, 114 the doglegged direction opposite to the pretilt direction 19 C1 orientation and the doglegged direction identical to the pretilt direction as C2 orientation. Another point that has to be added here in uniform (U) and twisted (T) orientation. A uniform orientation exhibits the extinguished position and a twisted orientation does not exhibit the extinguished position. Koden et al. reported in the draft paper presented at 1991 Liquid Crystal Discussion that a parallel rubbing ferroelectric liquid crystal device using an aligning film with a large pretilt angle provided three orientations such as C1U, C1T, and C2. The inventors of the present invention further inspected these three orientations to find out that the parallel rubbing ferroelectric liquid crystal device provide four orientational states such as C1U, C1T, C2U and C2T. FIG. 11 is a sectional view of the ferroelectric liquid crystal illustrating these orientational states. Symbols (a) and (b) designate C1 orientation exhibiting an opposite direction between the doglegged direction of the chevron layer structure and the pretilt 19 direction. Symbols (c) and (d) designate C2 orientation exhibiting an identical direction between the doglegged direction and the pretilt 19 direction. Among them (a) and (c) also designate a uniform orientation in which the directions of the liquid crystal molecules are identical other hand, (b) and (d) also designate a twisted orientation having a twisted portion between the doglegged portion and the interface of the aligning film.

A driving means in accordance with the present invention used a voltage-response rate relationship wherein a specific applied voltage minimized the response rate whereas the voltage on both sides of the specific voltage increased the response rate (the specific applied voltage that minimized the response rate is referred to as Vmin hereinafter).

Consequently, the conventional liquid crystal material that does not have Vmin requires use of non-rewriting voltage smaller than the rewriting voltage to provide a high speed switching. The present invention inhibits the reduction in contrast because of the bias voltage permitting the use of the non-rewriting voltage waveform larger than the rewriting voltage waveform through the usage of a ferroelectric liquid crystal molecule having a dielectric anisotropy of less than 0.

Besides, C2U orientation when driven by a method using Vmin in the above driving means in accordance with the present invention though providing a low contrast with conventional driving methods will result in an enlarged memory angle and almost complete inhibition of the light leakage, thereby providing a high contrast.

Besides, as shown in Table 5, the response rate of C2U orientation is faster than C1U.

TABLE 5

| Aligning Film | Liquid crystal material | Response rate C1U (μsec) | C2U (μsec) |
|---|---|---|---|
| PSI-XS012 | SCE-8 | >1500 | 600 |
| PSI-A-2101 | SCE-8 | >1000 | 590 |
|  | Liquid crystal mixture 2 | 1100 | 750 |
|  | Liquid crystal mixture 3 | >3000 | 500 |
| RN-715 | SCE-8 | 800 | 700 |

TABLE 5-continued

| Aligning Film | Liquid crystal material | Response rate C1U (μsec) | C2U (μsec) |
|---|---|---|---|
| PSI-A-2001 | SCE-8 | >2000 | 2000 |

Incidentally, Table 5 shows values obtained in a display device with the same structure as shown in Example 1 in which the aligning film materials and the liquid crystal materials shown in Table 5 are combined. In addition, the C1U orientation in Table 5 was obtained by generating a zigzag defect.

Figure 7A:
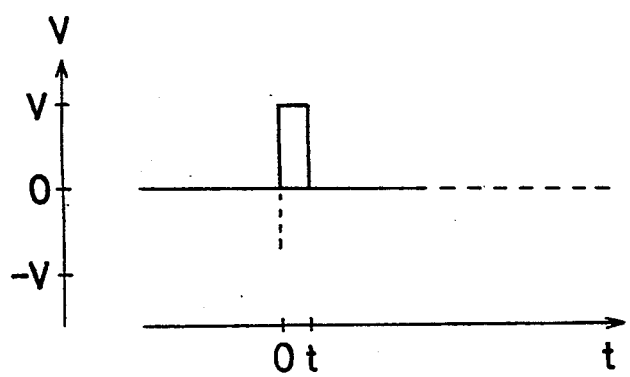
FIGS. 7a and 7b are a view illustrating a voltage waveform applied for measuring the properties of the ferroelectric liquid crystal having $\Delta\epsilon<0$.
Figure 7B:
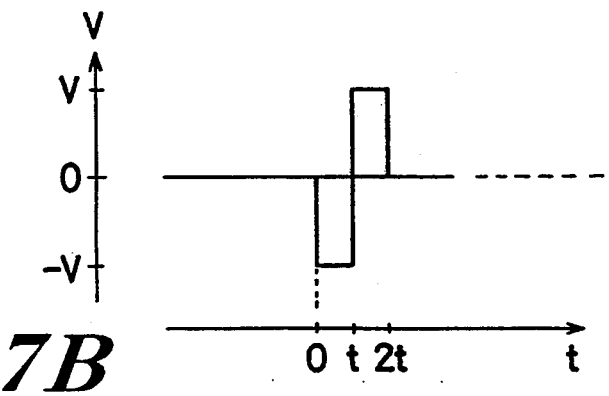

The memory pulse width designate one when a bipolar pulse shown in FIG. 7(b) is applied. The pulse voltage is set to 5 V/μm, which was determined with the minimum pulse width required for rewriting the entire surface of the pixel.

In addition, C2U orientation tends to have smaller Vmin than C1U. The range of behavior temperature of the former is wider than the latter.

On the other hand, C1T orientation exhibits no extinguished position whereas C2T orientation state transforms the uniform by increasing the bias voltage applied to the pixel in the non-selection period in the matrix driving, thereby improving the quenching properties. But C1T and C2T are inferior to C2U in terms of high speed and low voltage driving.

It naturally follows from the above when driving the device with the driving means of the present invention, C2U orientation exhibits the highest contrast, thereby providing a high response rate. Besides, low voltage driving can be made possible.

The second construction of the present invention having a pretilt angle of 5° or more and 10° or less is to homogenize the above C2U orientation.

When the pretilt angle becomes larger than 10°, C1U orientation contaminates in addition to C2U orientation. When the pretilt angle is less than 5°, C1T orientation contaminates in addition to C2U orientation, thereby providing a non-unified orientation.

By contrast, when the pretilt angle is 5° or more and 10° or less, C2U orientation unified to any liquid crystal material can be provided on all the pixels.

Besides, the spontaneous polarization of less than 10 nC/cm$^2$ will result in a reduced Vmin.

EXAMPLES

Example 1

An example of a ferroelectric liquid crystal device according to the present invention will be detailed hereinbelow.

FIG. 1 is a sectional view illustrating one example of a ferroelectric liquid crystal according to the present invention. There are provided two glass substrates 2a, 2b (having a thickness of about 2 μm) arranged opposite to each other, a plurality of transparent signal electrodes S comprising indium tin oxide (hereinafter referred to as ITO) arranged in parallel to each other, and a transparent insulating film comprising SiO$_2$ (with a thickness of about 200 nm). On the surface of the other glass substrate 2b opposite to the signal electrode S a plurality of transparent scanning electrode L comprising ITO arranged in parallel to each other in the direction of crossing clockwise a signal electrode S. The surface of the glass substrate with a plurality of scanning electrodes and a plurality of signal electrodes is coated with a insulating film 3b comprising SiO$_2$. On the surface of each insulating film 3a, 3b are formed aligning films 4a, 4b which has been subjected to a uniaxial orientation treatment with a rubbing treatment. The two glass substrates are plastered to each other with a sealer 5 with a portion thereof retained as a disposing port. From the disposing port is sandwiched a ferroelectric liquid crystal 6 in a space sandwiched between the aligning films. The above disposing port is sealed with the sealer 5. The two glass substrates 2a, 2b thus plastered to each other are sandwiched with two polarizing plates 7a, 7b disposed in such a manner that the polarizing axes cross each other at right angle.

In Example 1, PSI-A-2101 (manufactured by Chisso Petrochemical Corp.) was used as an aligning film. The pretilt angle ranges about 7°. The aligning film had a thickness of about 50 nm.

Subsequently, the first and the second aligning films were arranged in such a manner that the rubbing directions on the films ran in the same direction, namely the pretilt angles were directed to the opposite directions. Between the aligning films are disposed SCE-8 (manufactured by E Merck) with Δε of −1.8 and Ps of 3.2 nC/cm$^2$ as a ferroelectric liquid crystal 6.

The orientation of the ferroelectric liquid crystal display device was observed and the tilt angle and the memory angle are measured. The tilt angle was 21.4° and the memory angle was 13.9°. Here the tilt angle is ½ of the angle between two extinguished position when no electric field is applied. The memory angle is an angle between two extinguished positions when no electric field is applied.

The ferroelectric liquid crystal exhibited C2U orientation showing a favorable quenching properties on the entire surface thereof.

Figure 13B:
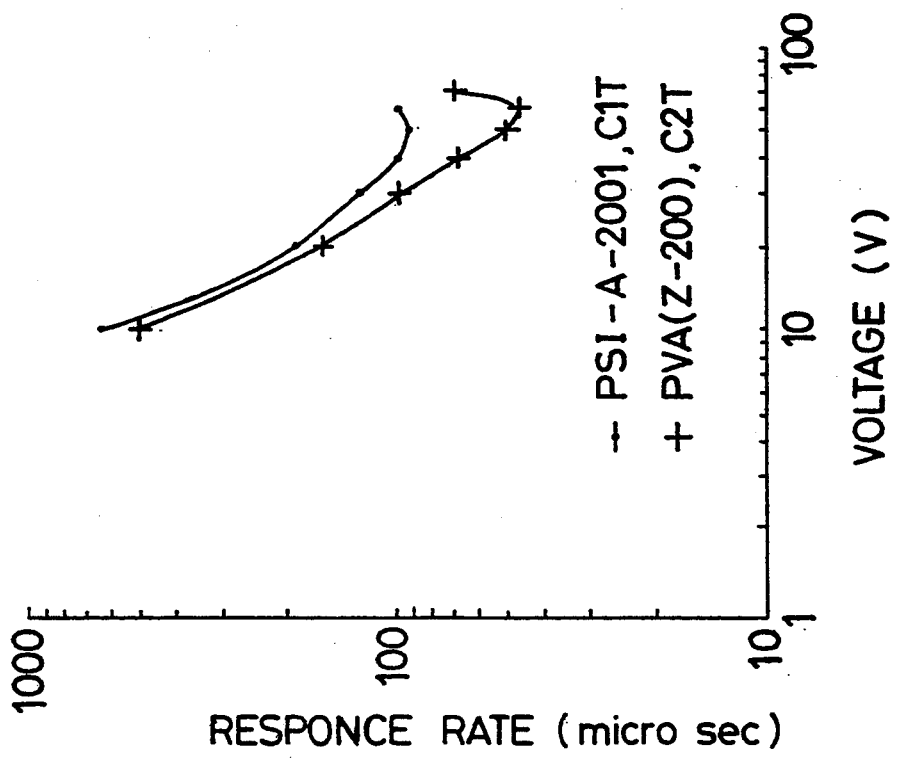
FIGS. 13a and 13b are a view illustrating the properties of the ferroelectric liquid crystal having $\Delta\epsilon<0$ used in one embodiment of the present invention.
Figure 13A:
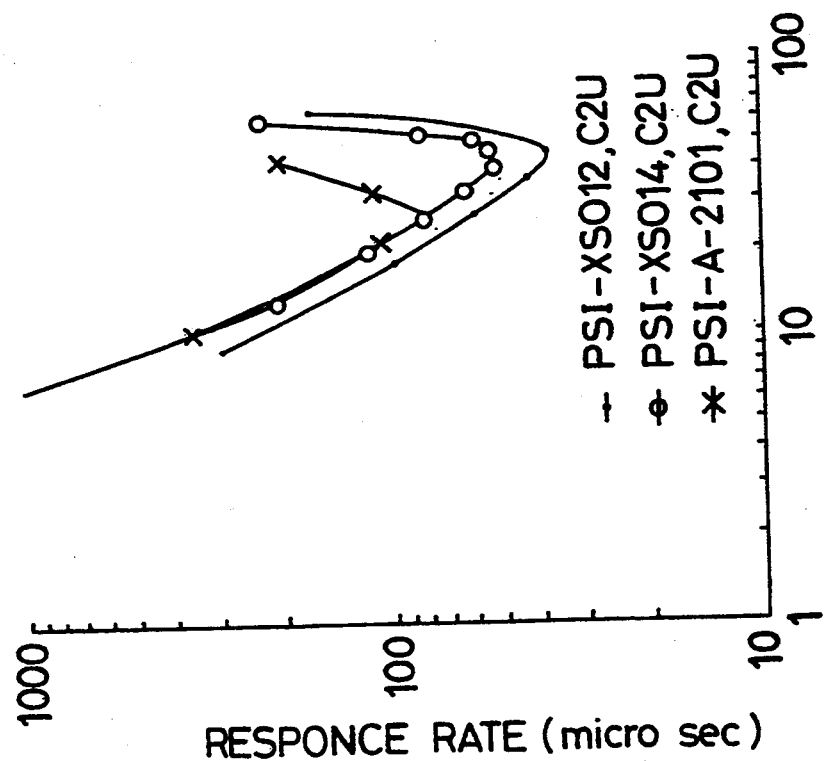

A voltage-response rate relationship in the ferroelectric liquid crystal device fabricated was measured by using a voltage waveform shown in FIG. 7(a). FIG. 13(a) shows the measurements. To give a favorable contrast at a driving voltage suitable for the driving method mentioned later, the minimum value of the response rate in the voltage-response rate relationship and the voltage exhibiting the minimum value need to be clear and small. In Example 1, as shown in FIG. 13(a), a voltage (Vmin) was present in the vicinity of 25 V which minimized, the response rate.

Figure 3:
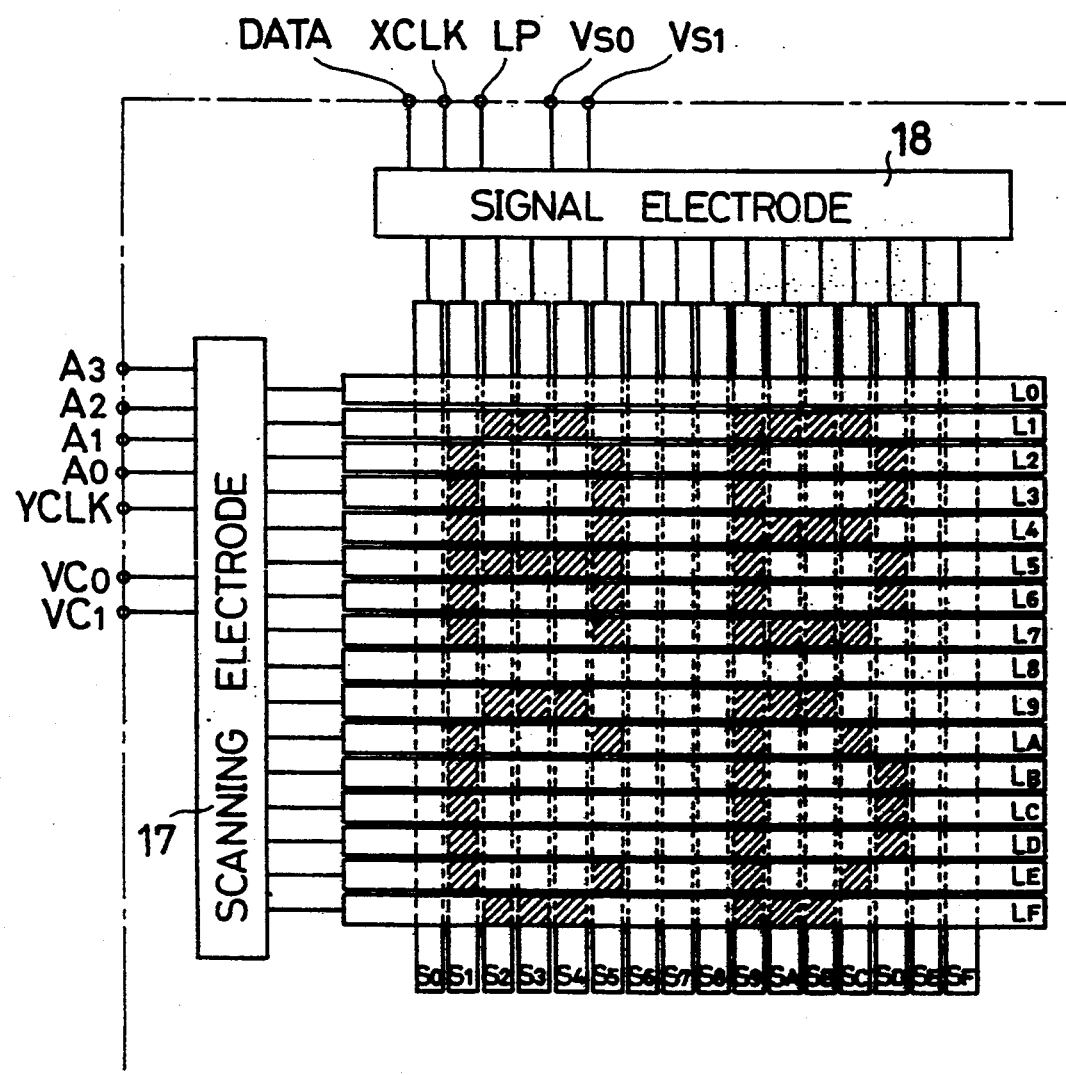
FIG. 3 is a view illustrating a construction of a driving system of the ferroelectric liquid crystal display device.
Figure 4:
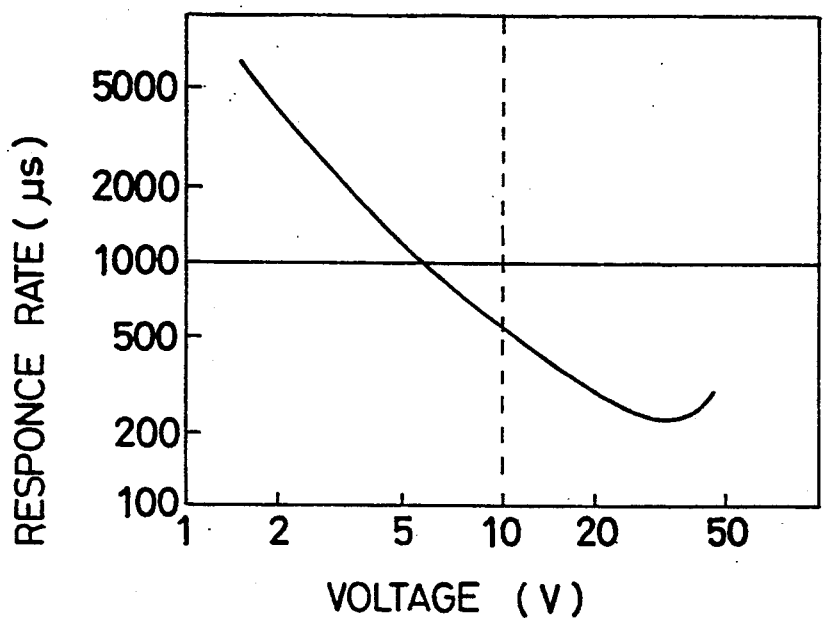
FIG. 4 is a view illustrating the properties of the ferroelectric liquid crystal having $\Delta\epsilon<0$.
Figure 5:
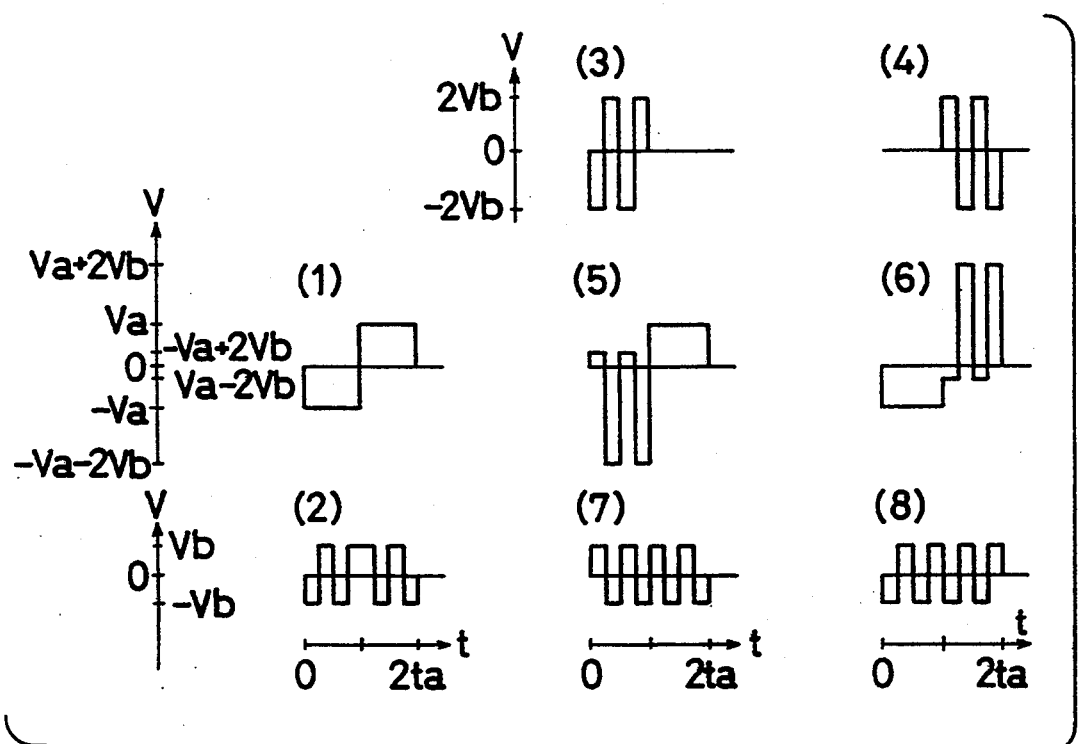
FIG. 5 is a view illustrating a driving voltage waveform in a conventional ferroelectric liquid crystal having $\Delta\epsilon<0$.
Figure 6:
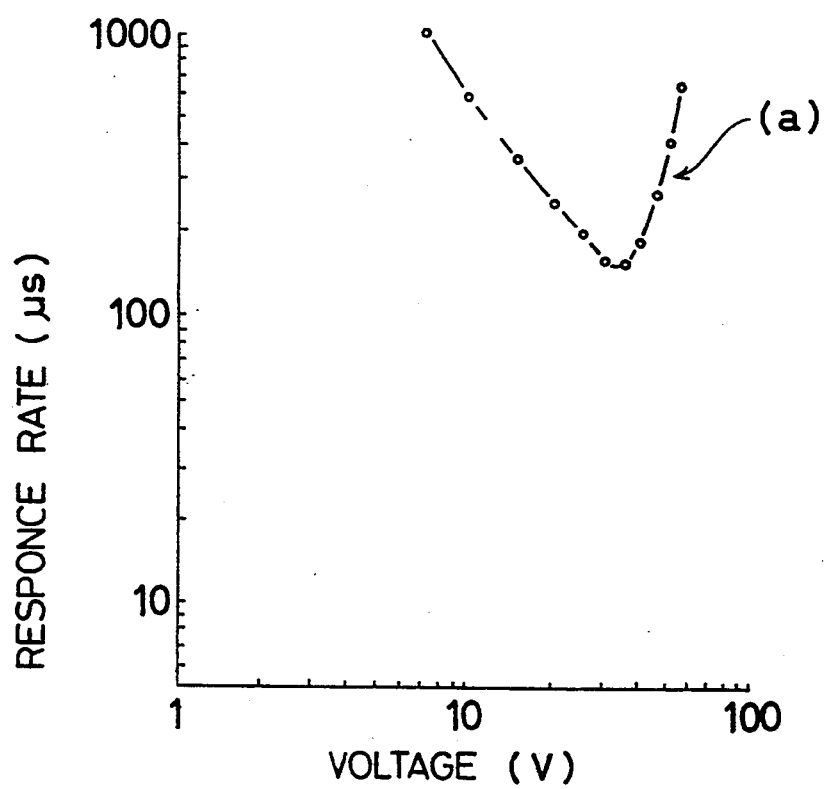
FIG. 6 is a view illustrating the properties of other type of a ferroelectric liquid crystal having $\Delta\epsilon<0$.

FIG. 3 is a view illustrating a schematic construction of a driving system of this ferroelectric liquid crystal display device.

Each of the scanning electrodes L was made distinct by adding a subscript i (i=0 through F) while each of the signal electrodes S was made distinct by adding a subscript j (j=0 through F). Besides, in the foregoing explanation, a pixel formed at a portion where an arbitrary scanning electrode $L_i$ and an arbitrary signal electrode $S_j$ intersect with each other will be designated by a symbol $A_{ij}$.

The side of the scanning electrode is connected while to the signal electrode S a driving circuit 18 on the side of the signal electrode is connected. The driving circuit 17 on the side of the scanning electrode serves as a circuit for applying a voltage to the scanning electrode L, which circuit is constituted of an address decoder and a latch and an analog switch not shown in the drawings to apply a select voltage $V_{c1}$ to the scanning electrode $L_i$ corresponding to a designated pixel $A_{ij}$ and a non-select voltage $V_{c0}$ to other scanning electrodes $L_k$ (k≠i). On the other hand, a driving circuit 18 on the side of the signal electrode serves as a circuit for applying a voltage to the signal electrode S, which circuit is constituted of a shift register, a latch and an analog switch not shown in the drawings to apply a rewriting voltage $V_{s1}$ for generating a black state to display a black state to the signal electrode $S_j$ while applying a rewriting voltage $V_{s0}$ for generating a white state to display a white state.

In the foregoing passage, a driving method for the driving system will be detailed in connection with the drawings. With respect to the pixel, four pixels formed of two scanning electrodes $L_1$, $L_2$ and two signal electrodes $S_1$, $S_2$ will be explained hereinbelow.

A ferroelectric liquid crystal display device using the liquid crystal having $\Delta\epsilon<0$ and providing a minimum response rate as voltage-response rate properties enables setting the voltage to be applied thereto in such a manner that the force received by the liquid crystal molecule upon the application of a voltage $(V_0+V_1)$ in a region having a large effect of $\Delta\epsilon<0$ as set in the following formula (2) becomes approximately equal to the force received by the liquid crystal molecule upon the application of a voltage in a region having a small effect of $<0$ as set in the following formula (3).

$$(V_0+V_1)>V_{min} \quad (2)$$

$$V_0/2<V_{min} \quad (3)$$

Figure 15:
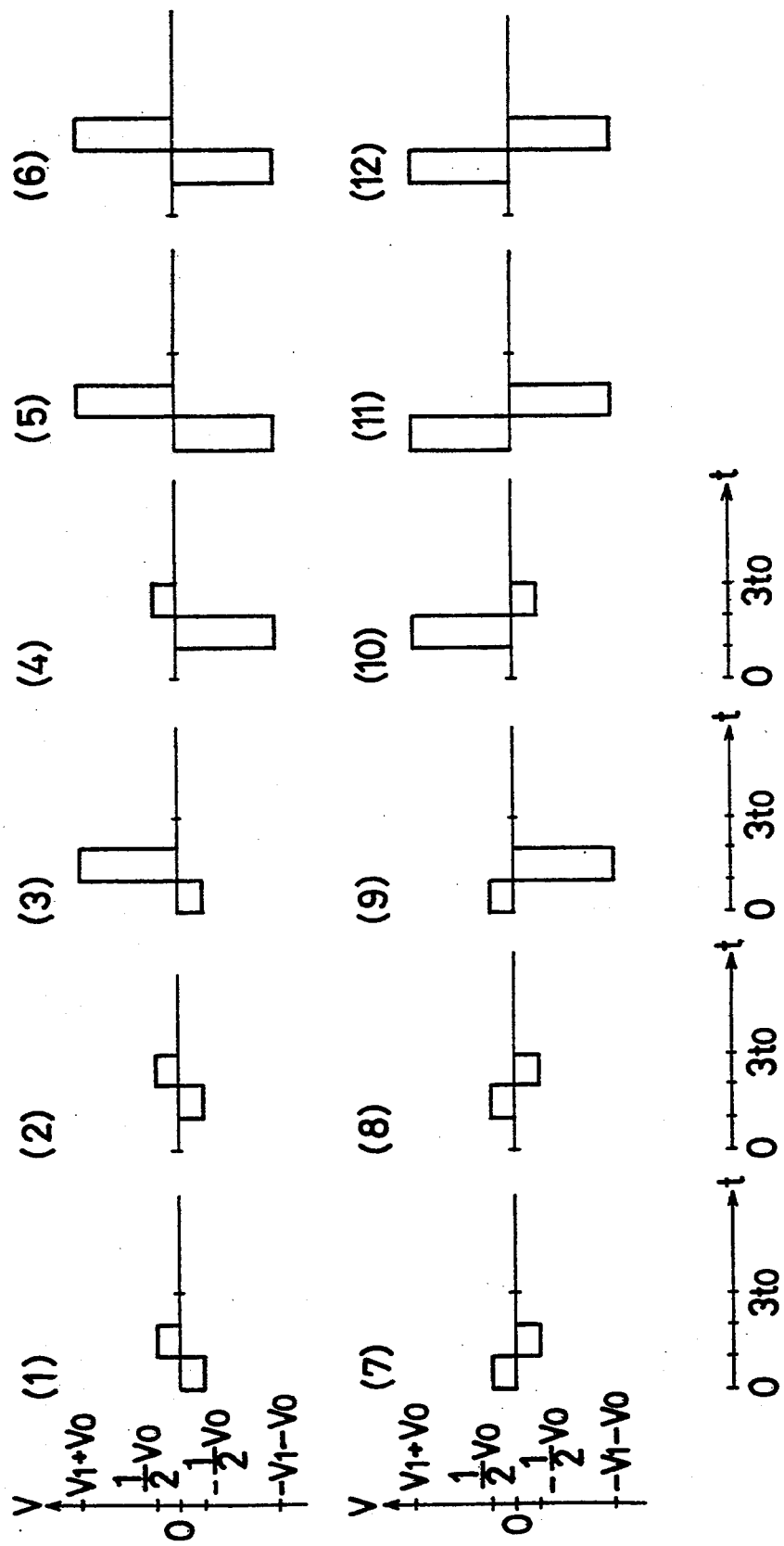
FIG. 15 is a view illustrating a driving voltage waveform used in one embodiment of the present invention.

Then, there is shown the presence of the voltage waveform shown by (2) through (6) in FIG. 15 as a voltage waveform causing a variation in the quantity of transmitted light identical to the counterpart generated in a pixel when applying a voltage waveform with a continuous presence of the voltage $V_0/2$ and voltage 0 subsequent to the voltage $-V_0/2$ shown by (1) in FIG. 15 to a pixel either white or black placed in a memory state. Besides, there is shown the presence of the voltage waveform shown by (8) through (12) in FIG. 15 as a voltage waveform causing a variation in the quantity of transmitted light identical to the counterpart generated in a pixel when applying a voltage waveform with a continuous presence of the voltage $-V_0/2$ and the voltage 0 subsequent to the voltage $V_0/2$ shown by (7) in FIG. 15 to a pixel either white or black placed in a memory state.

Hereinafter is described a method for determining a driving waveform for use in the ferroelectric liquid crystal display device in which is disposed a liquid crystal having a dielectric anisotropy of $\Delta\epsilon<0$ and the above properties. At this point, the quantity of transmitted light in a pixel unsubdued to a rewriting process is rendered approximately equal, thereby inhibiting the generation of cross talks.

At the outset, a voltage to be applied to a pixel at a non-select case is determined while rewriting pexil $A_{11}$. At this point, a select voltage is applied to $L_1$ whereas a non-select voltage is applied to $L_2$ while the rewriting voltage is applied to a signal electrode $S_1$ and the holding voltage is applied to a signal electrode $S_2$. When FIG. 15 (1) shows a voltage waveform applied to pixel $A_{22}$ constituted of a scanning voltage $L_2$ to which non-select voltage is applied and a signal electrode $S_2$ to which a holding voltage is applied so to change a transmitted light by a voltage waveform equivalent to transmitted light change in a pixel, the voltage waveform shown by (1) in FIG. 15 is identical to the counterpart shown by (2) through (6)in FIG. 15. Out of such voltage waveforms, the voltage waveform shown by (2) in FIG. 15 is one which is applied to a pixel $A_{21}$ constituted of a scanning electrode $L_1$ to which the non-select voltage is applied and a signal electrode $S_1$ to which the rewriting voltage is applied.

In the next process, the voltage waveform applied to pixel. $A_{12}$ constituted of a scanning electrode $L_1$ to which a select voltage is applied and a signal electrode $S_2$ to which a holding voltage is applied will be determined from the voltage waveforms shown by (1) through (6) in FIG. 15. At this point, a variation in the quantity of transmitted light $A_{12}$ is rendered equal to the counterpart of $A_{21}$, $A_{22}$ to which the former non-select voltage waveform is applied. There is provided a relationship (4) as shown hereinbelow between voltages $V_{22}$, $V_{21}$, $V_{11}$ and $V_{12}$ applied to a pixel $A_{22}$, $A_{21}$, $A_{11}$ and $A_{12}$ constituted of a scanning electrode to which the select voltage is applied and signal electrode to which the rewriting voltage is applied.

$$V_{22}-V_{21}=V_{12}-V_{11} \quad (4)$$

Namely the following relationship is established.

$$V_{11}=V_{12}-(V_{22}-V_{21}) \quad (5)$$

Consequently, determining a voltage waveform to be applied to a pixel $A_{12}$ in such a manner that the voltage applied to the pixel $A_{11}$ includes only 0 or positive voltage shown by (3) in FIG. 15.

FIG. 16(a) shows a combination of voltage waveform given by performing the above calculation using a voltage waveform chart. For example, Reference Numeral (5) in FIG. 16(a) designates a voltage waveform applied to a pixel $A_{11}$.

In the same manner, a combination of voltage waveforms shown in FIGS. 16(b) through (d) can be made. Here, referring to FIGS. 16(a) and (b), the pixel is rewritten into black since a positive voltage is applied to pixel $A_{11}$ to be rewritten. On the other hand, referring to FIG. 16(c) and (d) the pixel is rewritten into white since a negative voltage is applied to pixel $A_{11}$ to be rewritten.

Figure 17A:
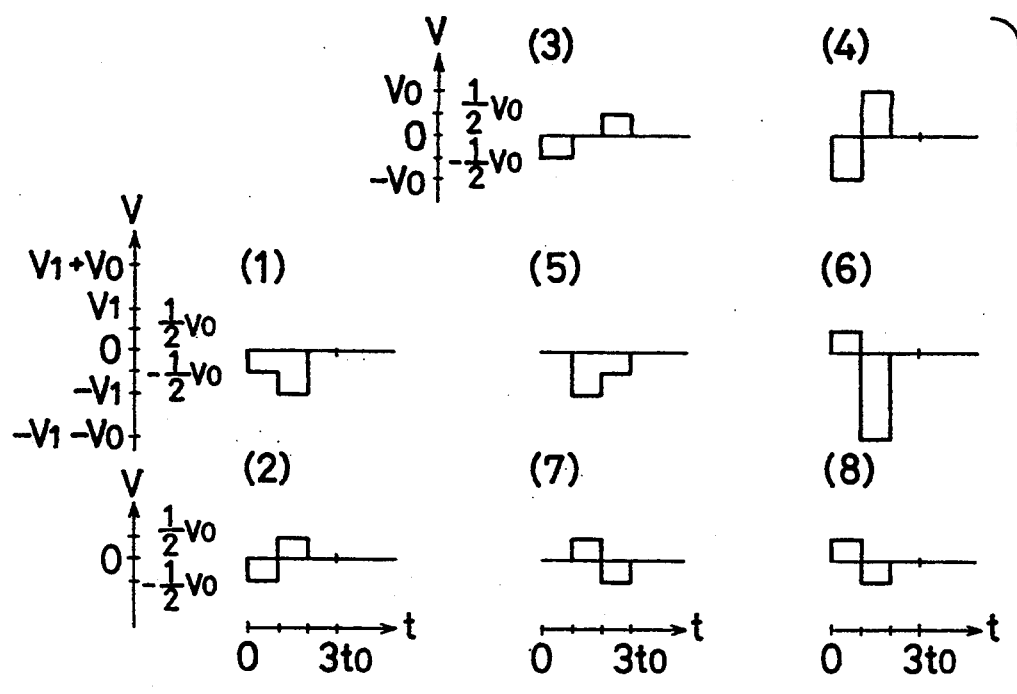
FIGS. 17a and 17b are a view illustrating a driving voltage waveform used in one embodiment of the present invention.
Figure 17B:
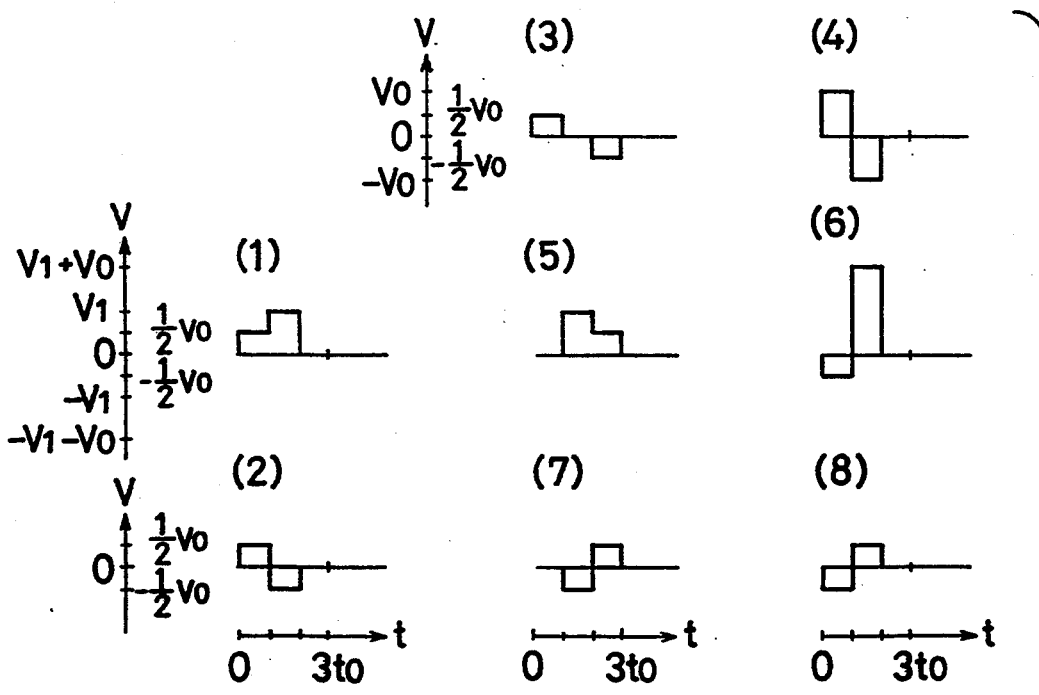

It is possible to determine a combination of voltage waveforms applied to a scanning electrode and a signal electrode shown in FIG. 17(b).

Figure 16:
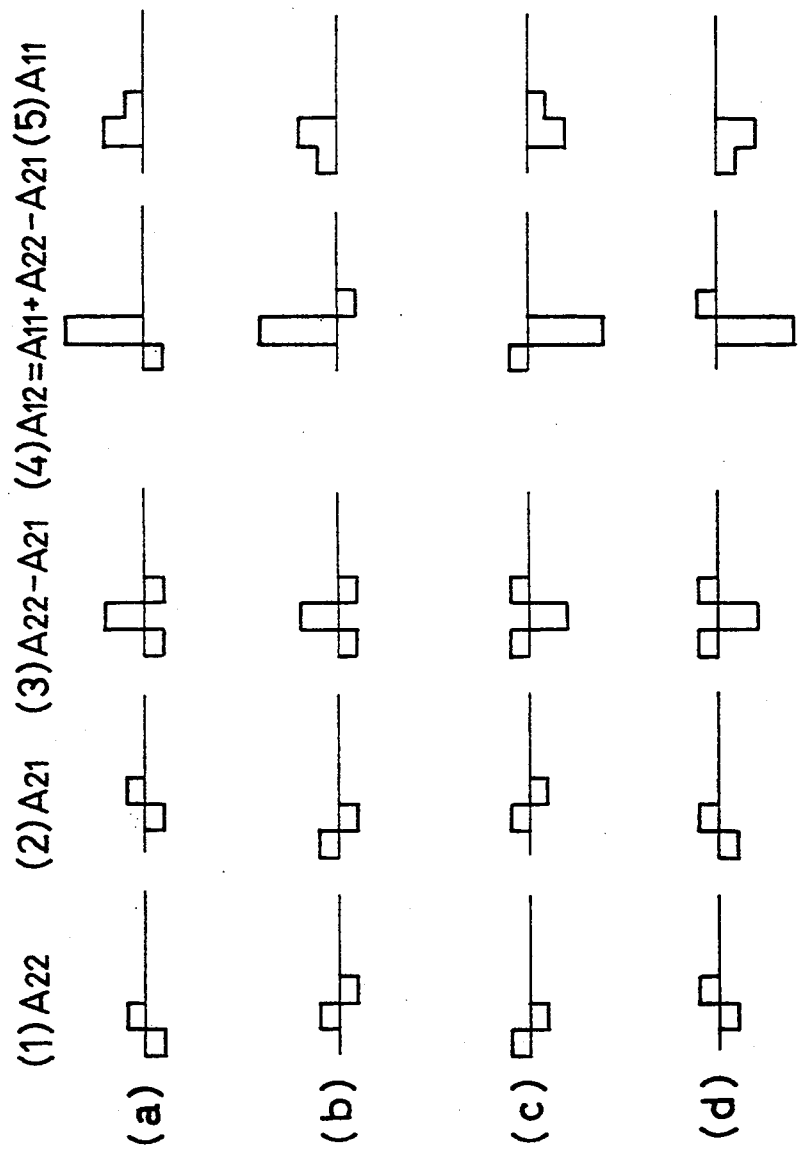
FIGS. 16a, 16b, 16c and 16d are a view illustrating a driving voltage waveform used in one embodiment of the present invention.

As an voltage waveform to be applied to a pixel constituted of a scanning electrode to which a non-select voltage shown in FIG. 17(a) (8) and in FIG. 17(b) (8), and a signal electrode to which a holding voltage is applied, a voltage waveform of (1) $A_{22}$ formed by combining voltage waveforms shown in FIG. 16(a) and (c), a voltage waveform of (2) $A_{21}$ formed by combining voltage waveforms shown in FIG. 16(c) and (a) as voltage waveforms to be applied to a pixel and constituted of a scanning electrode to a non-selection voltage waveform and a signal electrode to a selection voltage. As a voltage waveform applied to a pixel constituted of a scanning electrode to which a select voltage shown by (6) in FIG. 16(a) or (b) and a signal electrode to which a holding voltage is applied a voltage of (4) $A_{12}$ combining the voltage waveforms of (c) or (a) shown in FIG. 16. As a voltage waveform to be applied to a pixel constituted of a scanning electrode to which a selection voltage waveform shown in FIG. 17(a) or by (5) in FIG. 17(b) a voltage waveform of $A_{11}$ shown by (5) in FIG. 17(b) combining voltage waveforms (c) or (a) in FIG. 16.

When the select voltage waveforms to be applied to the scanning electrode is determined to be either (1) in FIG. 17 (a) or (1) in FIG. 17(b), a rewriting voltage waveform applied to the signal electrode is given as either (3) in FIG. 17(a) or (3) in FIG. 17(b), it is determined sequentially in the following order that a non-select voltage waveform applied to the scanning electrode is given as either (2) in FIG. 17(a) or (2) in FIG. 17(b), and a holding voltage waveform to be applied to the signal electrode is given as (4) in this order. That is because when the voltage shown by (2) in FIG. 17(a) is set to be $V_1$, the voltage shown by (2) in FIG. 17(a) is set to be $V_2$, the voltage shown by (3) in FIG. 17(a) is set to be $V_3$, and the voltage shown by (4) in FIG. 17(a) is set to be $V_4$, the following relationship is established.

$$V_3 = V_1 - V_5 \quad (6)$$

$$V_4 = V_1 - V_6 \quad (7)$$

$$V_2 = V_3 + V_7 \quad (8)$$

In this way, setting a voltage waveform to be applied to the pixel results in an equal variation in the quantity of transmitted light between a pixel generated in applying a voltage waveform in a region with a large effect of $<0$ shown either in FIG. 17(a) (6) and in FIG. 17(b) (6) and a pixel generated in applying a voltage waveform in a region with a small amount of effect of $<0$ shown either by (7) or (8) in FIG. 17(a) or by (7) or (8) in FIG. 17(b), thereby providing a ferroelectric liquid crystal having a high display quality that does not generate any flicker.

With the use of a voltage $V_0 + \alpha(\alpha>0)$ in the place of the voltage $V_0$ both in FIG. 17(a) and FIG. 17(b), a variation in the quantity of transmitted light in a pixel in applying a voltage waveform shown by (6) in FIG. 17(a) or by (6) in FIG. 17(b) becomes smaller than a variation in the quantity of transmitted light in a pixel when the voltage waveform shown either by (7) or (8) in FIG. 17(a) or by (7) or (8) in FIG. 17(b), which is more preferable.

Subsequently, in this particular driving method, a bias ratio is inspected as a scale of contrast. The bias ratio here means a ratio of voltage applied to a pixel to be rewritten as against a ratio of voltage applied to a pixel to a non-select pixel. The larger the bias ratio, the larger the contrast becomes.

A combination of voltage waveforms shown in FIG. 17 is provided as a ratio of the voltage shown by (5) in FIG. 17 (a) or by (5) in FIG. 17(b) as against the voltage shown either by (7) or (8) in FIG. 17(a) or by (7) or (8) in FIG. 17(b).

$$B = V_0 \div (V_1 + V_0/2) \quad (9)$$

In the above relationship, a high contrast cannot be expected. However, a unit time axis in the combination of the voltage waveform shown in FIG. 17(a) is given as $t_0$ through $t_1$ whereas shifting the combination of the voltage waveform shown in FIG. 17(a) by time 2t between $t_0$ and $t_1$ and overlapping the combination twice provides a combination of voltage waveform shown in FIG. 18(b). The bias ratio B shown in FIG. 18 is given as the following relationship:

$$B = V_0/2 \div (2V_1 + V_0) \quad (10)$$

Increasing a combination of such overlapping allows actualizing a higher contrast. The reason why the combination of the voltage waveform can be overlapped many times is that the device is so arranged that the voltage waveform shown in FIG. 17(a) or by (6) in FIG. 17(b) showing a region having a large effect of $\Delta\epsilon<0$ and the voltage waveform shown in FIG. 17(a) or by (6) in FIG. 17(b) cannot change the memory state of the liquid crystal molecule at the application of non-select voltage. Besides, referring to FIG. 17 using voltage $V_0/2 + \alpha$ in the place of voltage $V_0/2$ can produce a higher contrast.

Figure 8A:
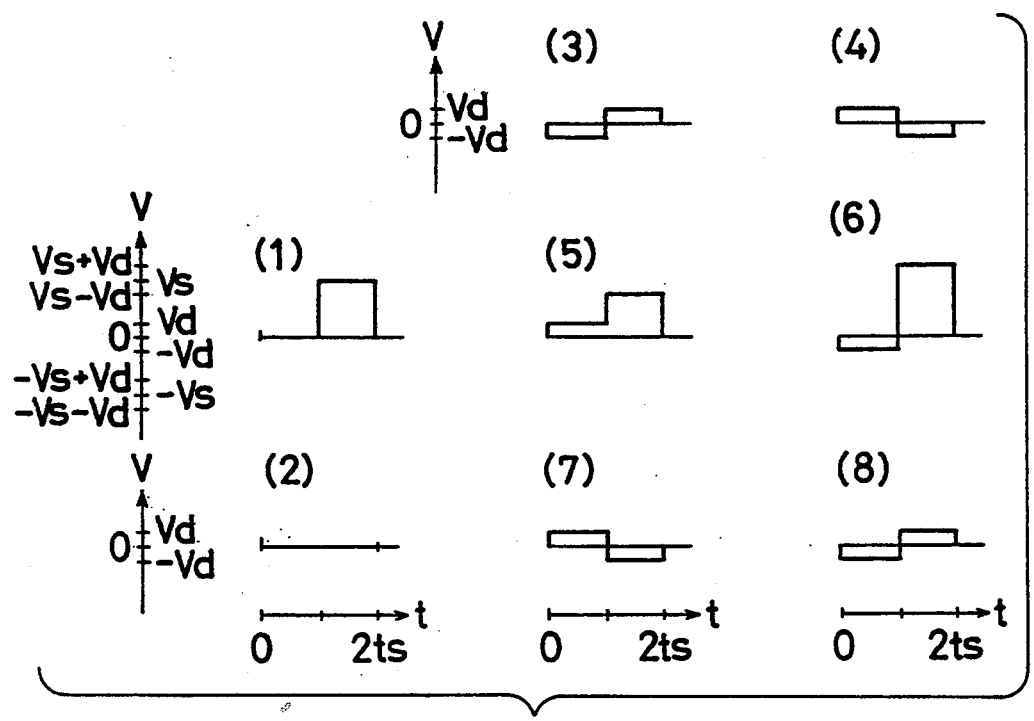
FIGS. 8a and 8b are a view illustrating other driving voltage waveforms of the conventional ferroelectric liquid crystal.
Figure 8B:
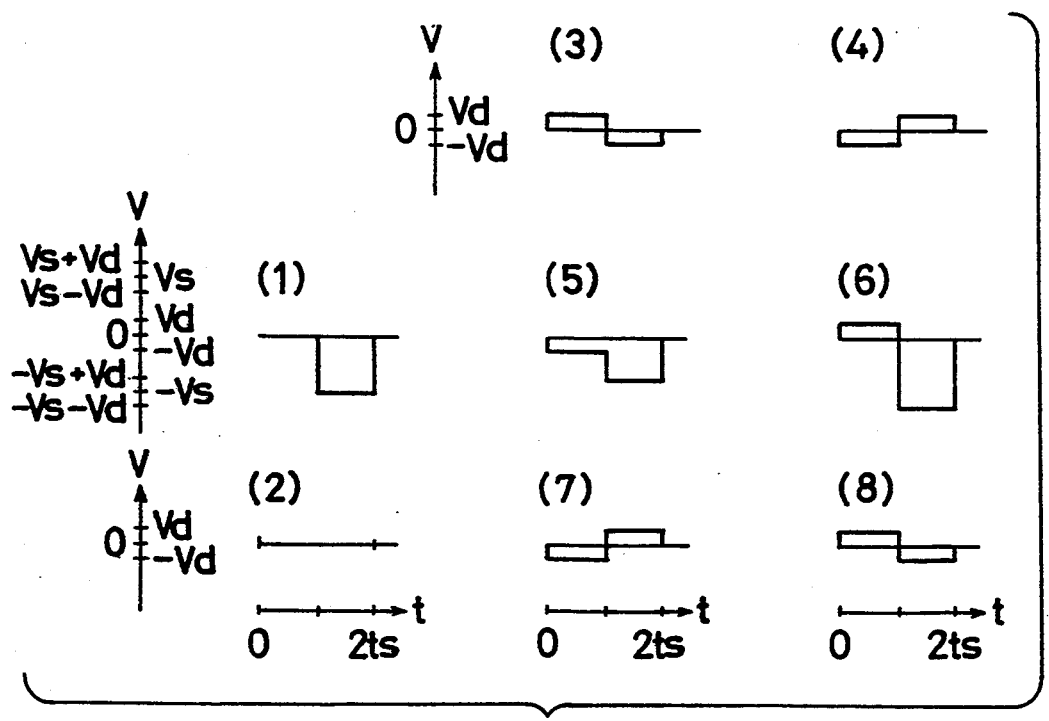
Figure 9:
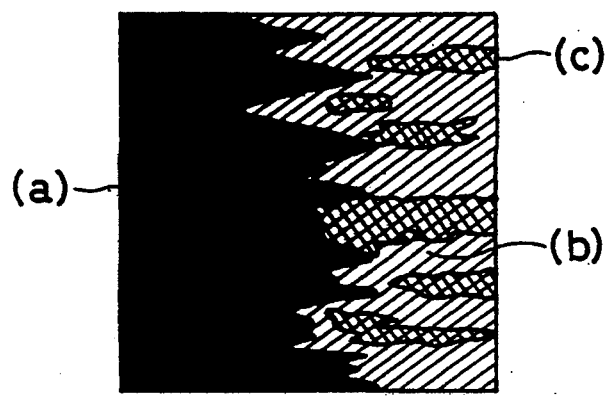
FIG. 9 is a view of observed state of the orientation in a conventional ferroelectric liquid crystal display device.
Figure 23:
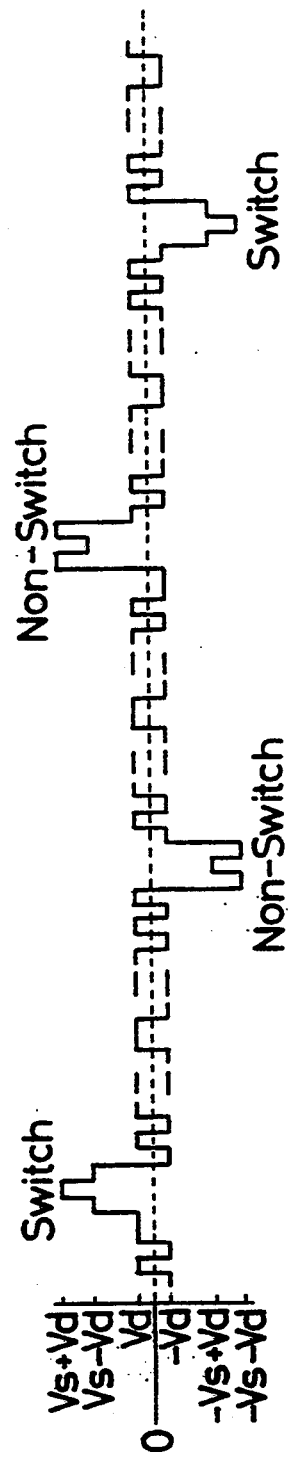
FIG. 23 is a view illustrating a driving voltage waveform used in another embodiment of the present invention.

The above driving method will be referred to as Driving Method 1. In addition to the above method Driving Method 2 shown in FIG. 8 (F. W. Surgery et al., Ferroelectrics, 122, 63 (1991) and Driving Method 3 shown in FIG. 23 (WO92/02925(PCT)) can be used.

Figure 18A:
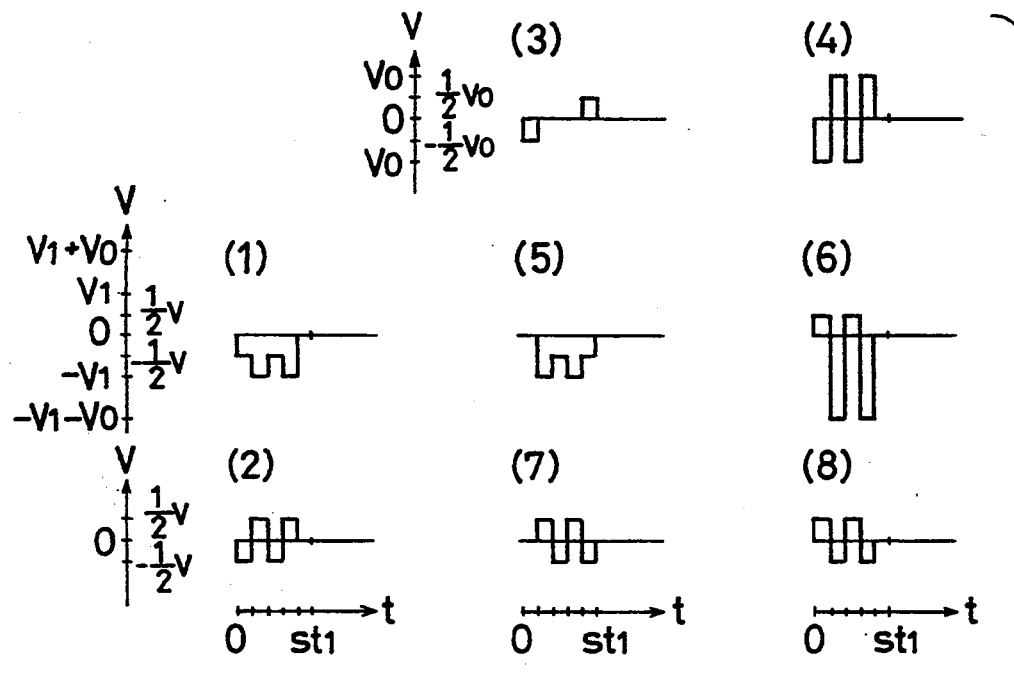
FIGS. 18a and 18b are is a view illustrating a driving voltage waveform used in another embodiment of the present invention, ferroelectric liquid crystal used in another embodiment of the present invention.
Figure 18B:
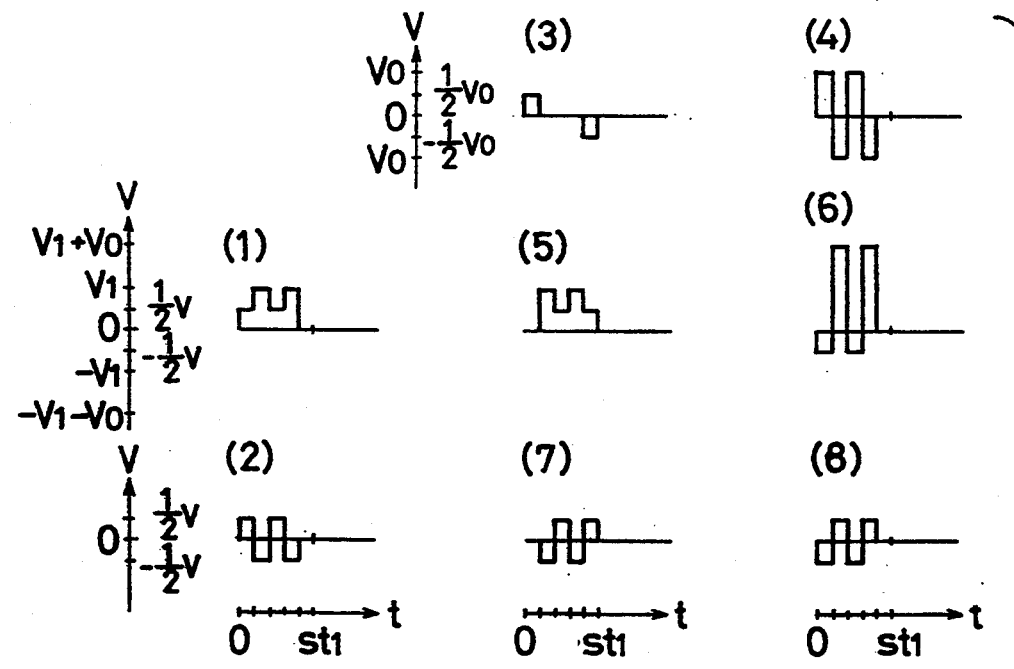

The device was moved by using the voltage waveform shown in FIG. 18. Referring to equation (2), voltage was fixed as shown in voltage $V_0 + V_1 = 50$ V. The voltage $V_0$ was rendered variable to compare the properties of an optical response measured as an electric signal with a photo-diode by applying the voltages shown by (7) and (8) in FIG. 18(a) to pixels and those of the same response measured as an electric signal with a photo-diode by applying the voltage shown by (6) in FIG. 18(a) to give the following voltages as a voltage that offers an approximately equal quantity of transmitted light.

$V_0/2 = 10.5$ V $V_1 = 29$ V

The voltage shown by (7) and (8) in FIG. 18(a) was used as a bias voltage to apply the voltage shown by (6) in FIG. 18(a) in a cycle of 10 Hz followed by using the voltage shown by (7) and (8) in FIG. 18(b) to apply the voltage shown by (6) in FIG. 18(b) in a cycle of 10 Hz. Although the process was repeated, no flicker was felt.

In addition, pixels could by rewritten into another state by applying the voltage shown by (5) in FIG. 18(a) in the place of the voltage shown by (6) in FIG. 18(a). Besides, pixels could be rewritten into another state by applying the voltage shown by (5) in FIG. 18(b) in the place of the voltage shown by (6) in FIG. 18(b). In this case, contrast 30 was given.

Comparative Examples 1 and 2

Figure 22:
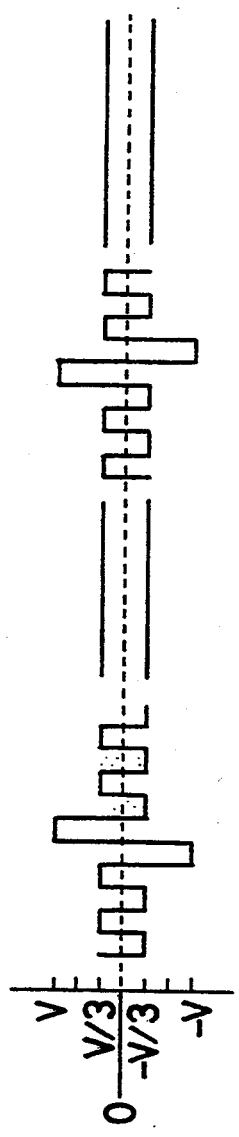
FIG. 22 is a view illustrating a driving voltage waveform used in another embodiment of the present invention.

When driving a ferroelectric liquid crystal display device fabricated in Example 1 with a voltage waveform shown in FIG. 22 free from using a voltage in a region having a large effect of dielectric anisotropy of less than 0, the device did not provide a high contrast because of a large quantity of light leakage caused by a bias voltage and slow switching.

Incidentally, the driving method is so-called ⅓ bias driving, which is not a driving method using Vmin provided by the present invention.

Comparative Examples 3 through 6

Table 1 shows the measurement of the orientational state of liquid crystals shown in Example 1, the tilt angle and the memory angles in a ferroelectric liquid crystal display device in accordance with the present invention.

TABLE I

| Aligning Film Material | Pretilt Angle | Orientation State | Tilt Angle | Memory |
|---|---|---|---|---|
| LX-1400 | 2° | C1U | | |

TABLE I-continued

| Aligning Film Material | Pretilt Angle | Orientation State | Tilt Angle | Memory |
|---|---|---|---|---|
| PSI-XS012 | 3° | C2T, C2U | 20.9° | 13.8° |
| PSI-XS014 | 3° | C2T, C2U | 21.4° | 14.0° |
| PSI-A-X007 | 5° | C2U | | 13.4° |
| PSI-A-2101 | 7° | C2U | 21.4° | 13.9° |
| RN-715 | 13° | C1T | | 10.8° |
| PSI-A-2001 | 14° | C1T | 22.8° | 11.4° |
| PSI-A-2001 | 14° | C1U, C2U | | 8.2° |
| PVA | 0° | C2T | 22.0° | 11.9° |

The pretilt angle was measured with magnetic capacity method by coating 9 kinds of aligning films shown in Table 1 each on a pair of glass substrates, subjecting the aligning films to rubbing, plastering together the pair of glass substrates to a thickness of 50 μm so that the rubbing directions run unparallel to each other and disposing a nematic liquid crystal E-8 (manufactured by E Merck): between the glass substrate.

The pretilt angle can be considered a pretilt angle relative to the aligning film of SCE-8 liquid crystal molecule with aligning film.

In the case of the pretilt angle of 5° and 7° relative to SCE-8 liquid crystal molecule, C2U orientation can be given all over the pixels. In the case of the pretilt angle of 3° C2T and C2U orientations are contaminated, and in the case of 14° either C1T or C2U can be given.

Example 1 uses PSI-A-2101 shown in Table 1 as an aligning film material. Hereinbelow is shown measurements of an example in which PSI-A-2001 was used in the place of PSI-A-2101.

The device of comparative example exhibited a twist orientation as mentioned later when no electric field was applied to result in giving no extinguished position. The angle between two positions where the quantity of transmitted light becomes lowest was set as a memory angle.

As shown in Table 1, the ferroelectric liquid crystal display device exhibited a contamination of C1U and C2U orientations in C1T orientation so that the device is in inferior in quenching properties and non-unified in display quality. A voltage-response rate relationship in C1T orientation as can be seen in the ferroelectric liquid crystal display device thus manufactured was measured by using a voltage waveform shown in FIG. 7(a). FIG. 13(b) shows the result of the measurement. As shown in FIG. 13(b), a voltage (Vmin) was present which minimizes the response rate. However, switching under the condition of $V_0 + V_1 = 50$ V cannot be conducted as shown in Example 1.

In addition, applying an electric field to a ferroelectric liquid crystal exhibiting C1T orientation as an initial orientation made it possible to change the orientation into C1U or C2U orientation. At this point, C1U orientation exhibited a slow switching speed compared with C2U orientation, which orientation is also inferior in stability, namely returned to C1T orientation with the passage of time.

In the next passage, measurements of aligning film using PVA will be shown hereinbelow.

The device of the comparative example exhibited a twist orientation when no electric field was applied so that no clear extinguished position. Consequently, the memory angle is set to be an angle between two positions where the quantity of transmitted light exhibits the lowest value.

As shown in Table 1, the ferroelectric liquid crystal display device exhibited. C2T orientation on the entire surface of the device so that the device was inferior in quenching properties.

A voltage-response rate relationship in the ferroelectric liquid crystal display device thus fabricated was measured by using a voltage waveform shown in FIG. 7(a). FIG. 13(b) shows the measurements. As shown in FIG. 13(b), a voltage (Vmin) was present in the vicinity of 60 V which minimized the response rate. However, no switching was conducted with a high contrast in the same method as in Example 1. Subsequently, the measurements using RN-715 (manufactured by Nissan Chemical Industries, Ltd.) are shown.

The memory angle exhibited a twist orientation when no electric field was applied so that no clear extinguished position was given. Consequently, the memory angle was set to be an angle between two positions where the quantity of transmitted light exhibits the lowest value.

As shown in Table 1, the ferroelectric liquid crystal display device exhibited a contamination of C2U orientation into C1T orientation with an inferior quenching properties.

Subsequently, the measurements of aligning films using PSI-XS012 and PSI-XS014 are shown.

A voltage-response rate relationship was measured by using a voltage waveform shown in FIG. 7(a). As shown in FIG. 13(a), a voltage (Vmin) was present in the vicinity of 40 V which minimized the response rate. However, as mentioned above, C2T and C2U orientations are contaminated so that the device exhibited an inferior quenching properties. Besides, in many cases, C2T orientation was exhibited.

Examples 2 Through 7

Examples 2 through 7 of the ferroelectric liquid crystals were fabricated by using as a ferroelectric liquid crystal liquid crystal compositions 1 through 6 having of less than 0 in which the following compounds 1 through 9 were mixed at rate shown in Table 2 in the place of SCE-8 used in Example 1.

Respective values of Δε ranges as follows; composition 1 exhibits −1.4, composition 2; −2.0, composition 3; −2.0 and composition 5; −1.7.

Figure 14B:
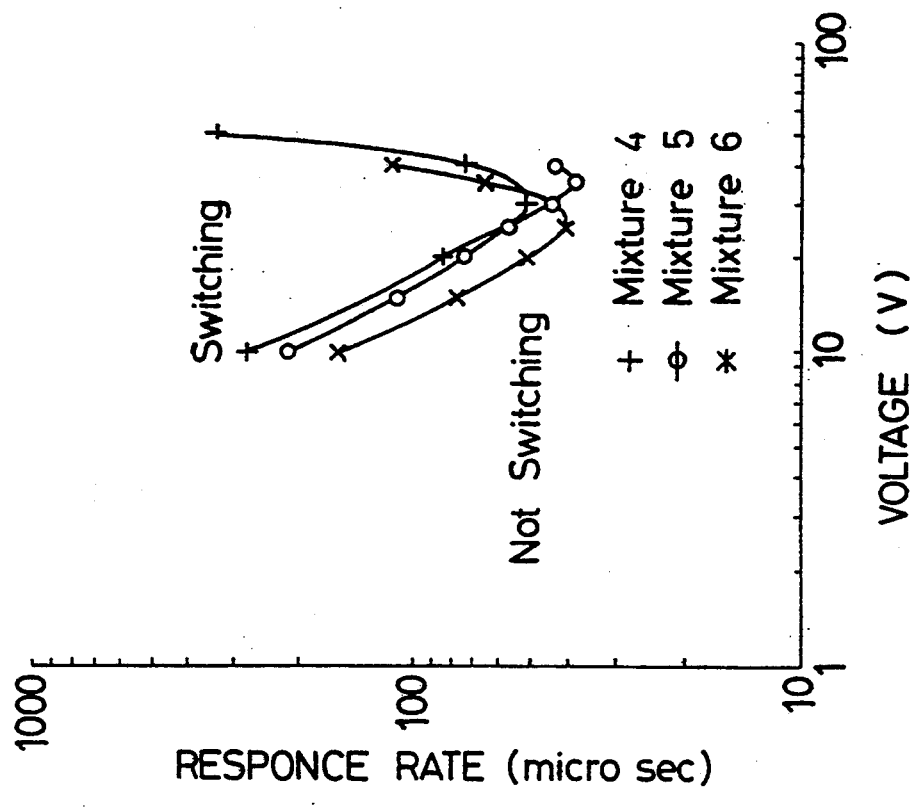
FIGS. 14a and 14b are a view illustrating the properties of the ferroelectric liquid crystal having $\Delta\epsilon<0$ used in another embodiment of the present invention.
Figure 14A:
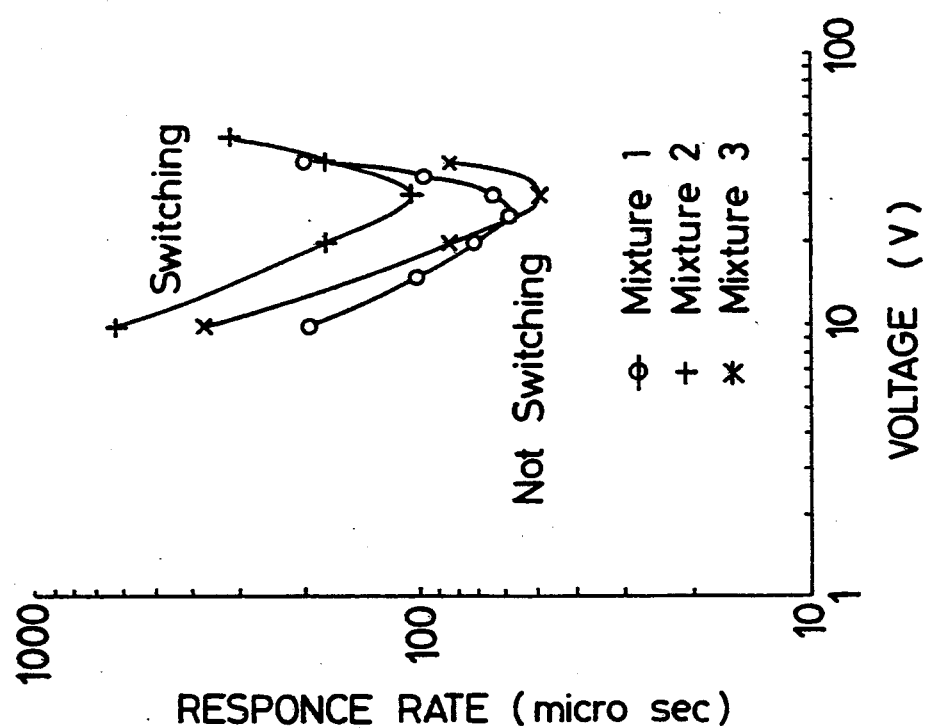

A voltage-response rate relationship in the ferroelectric liquid crystal devices thus manufactured was measured by using the voltage waveform shown in FIG. 7(a). FIG. 14 shows the measurements. As shown in FIG. 14 (a) and (b), a voltage (Vmin) was present in the vicinity of 25 to 30 V which minimized the response rate.

These ferroelectric liquid crystal display devices exhibited C2U orientation with a favorable quenching properties on the entire surface thereof.

TABLE 2

| | Transition Temperature | | | | Composition | | |
|---|---|---|---|---|---|---|---|
| | C | $S_C$ | $S_A$ | N | I | Ratio | Vmin | Ps |
| SCE-8 | −20· | 59· | | 79· | 100· | | 40 | +3.2 |
| Mixture1 | ·<RT· | 57· | | 80· | 100· | SCE-8:C1:C2:C3:C4:C5 = | 25 | +1.1 |

TABLE 2-continued

|  | Transition Temperature | | | | Composition Ratio | Vmin | Ps |
|---|---|---|---|---|---|---|---|
|  | C | $S_C$ | $S_A$ | N | I |  |  |
|  |  |  |  |  | 20:1:1:1:1:1 |  |  |
| Mixture2 | ·<RT· | 52· | 77· | 96· | SCE-8:ZLI-3234B = 4:1 | 30 | +2.0 |
| Mixture3 | ·<RT· | 81· | 95· | 119· | SCE-8:C6 = 4:1 | 30 | +1.3 |
| Mixture4 | ·<RT· | 65· | 77· | 99· | SCE-8:C7 = 9:1 | 30 | +1.8 |
| Mixture5 | ·<RT· | 65· | 86· | 106· | SCE-8:C8 = 9:1 | 35 | +2.2 |
| Mixture6 | ·<RT· | 59· | 84· | 105· | SCE-8:C9 = 9:1 | 25 | +2.2 |
| Mixture7 | ·<RT· | 56· | 77· | 96· | SCE-8:C10:C11:C8:C9 = 36:1:1:1:1 | 40 | +2.1 |
| Mixture8 | ·<RT· | 55· | 79· | 96· | SCE-8:C12 = 9:1 | 30 | +2.0 |
| Mixture9 | ·<RT· | 60· | 80· | 97· | SCE-8:C13 = 9:1 | 30 | +2.2 |
| Mixture10 | ·<RT· | 46· | 81· | 98· | SCE-8:C14 = 9:1 | 35 | +2.0 |
| Mixture11 | ·<RT· | 54· | 82· | 100· | SCE-8:C15 = 9:1 | 30 | +1.9 |
| Mixture12 | ·<RT· | 57· | 75· | 93· | SCE-8:C16 = 9:1 | 30 | +1.9 |
| ZLI-4851/000 | ·<−10· | 64· | 70· | 74· |  | 50 | −3.2 |
| ZLI-5014/000 | ·<−10· | 64· | 68· | 70· |  | 40 | −2.3 |

SCE-8, SCE-12 are compositions manufactured by E Merck
RT means room temperature.

The above ferroelectric liquid crystal display devices were operated by using the voltage waveform shown in FIG. 17 with $V_0/2=7.5$ V, $V_1=15$ V applied in a cycle of 10 Hz. At this point, no flicker was felt between two times; when the voltage waveforms shown in FIG. 17(a) (7) and FIG. 17(a) (8) in FIG. 17(b) (7) and (8) were applied and when the voltage waveform shown by (6) in FIG. 17(a) and (b) were applied. The display could be rewritten by applying the voltage waveform shown by (5) in FIG. 17(a) and (b).

Examples 8 Through 13

Examples 8 through 13 of the ferroelectric liquid crystal display device were fabricated by using as a ferroelectric liquid crystal liquid crystal compositions 7 through 12 having $\Delta\epsilon$ of less than 0 in which compounds (8) through (16) were mixed at a rate shown in Table 2 in the place of SCE-8 used in Example 1. As an aligning film PSI-A-X007 (manufactured by Chisso Petrochemical Corp.) was used to fabricate a ferroelectric liquid crystal display device.

Figure 20A:
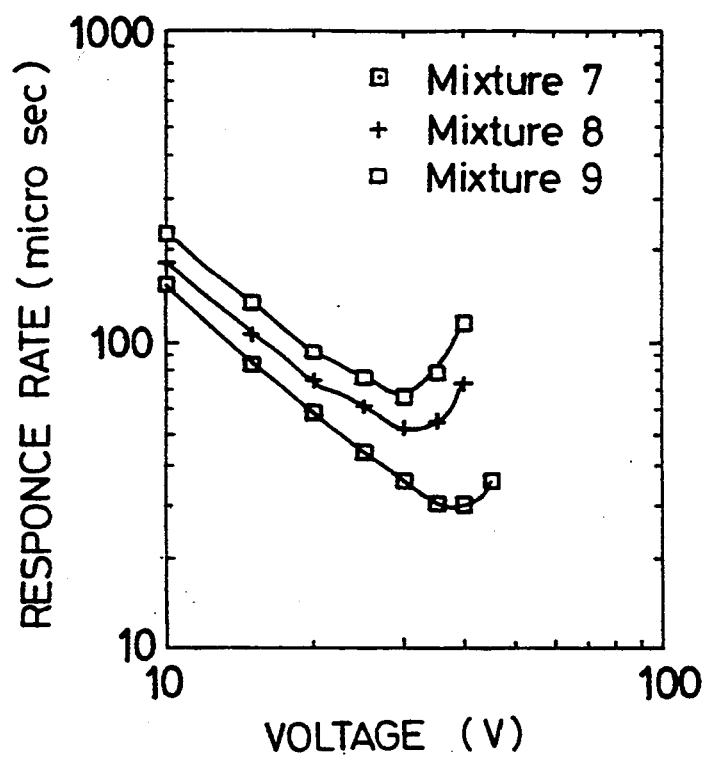
FIGS. 20a and 20b are is a view illustrating the properties of the ferroelectric liquid crystal having $\Delta\epsilon<0$ used in another embodiment of the present invention.
Figure 20B:
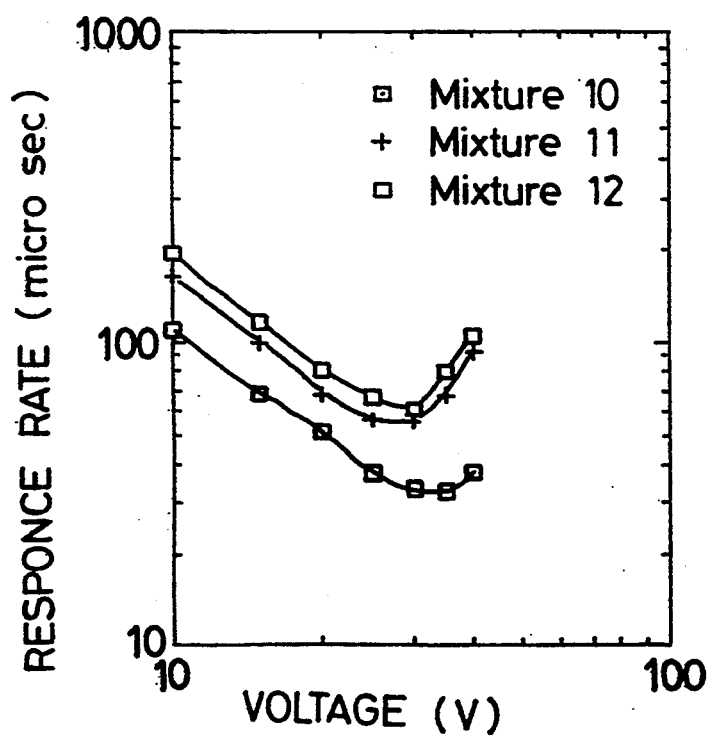

A voltage-response rate relationship in the ferroelectric liquid crystal display devices thus manufactured was measured by using the voltage waveform shown in FIG. 7(a). FIG. 20 shows the measurement. As shown in FIG. 20(a) and (b), a voltage (Vmin) was present in the vicinity of 30 to 40 V that minimized the response rate. These ferroelectric liquid crystal display device exhibited C2U orientation.

Driving these devices using the voltage waveform of the driving method 3 results in a driving voltage of about 40 V and provided a high speed and high contrast switching.

Incidentally, in the pretilt angle of 7°, it will be made clear that even changing the material in example 2 through 13 offers C2U orientation.

Examples 14 through 17

Table 4 shows the measurement of switching times and driving voltages when using the above driving methods 1, 2 or 3 with respect to devices formed by using liquid crystal compositions 1, 4 or 5 and ZLI-5014/000 ($\Delta\epsilon=-1.9$) The result was all favorable.

TABLE 4

| | Switching Time/Line(μs) [Driving Voltage(V)] | | |
|---|---|---|---|
| | Method 1 | Method 2 | Method 3 |
| Mixture1 | 260[30] | | |

TABLE 4-continued

| | Switching Time/Line(μs) [Driving Voltage(V)] | | |
|---|---|---|---|
| | Method 1 | Method 2 | Method 3 |
| Mixture4 | 324[40] | 248[40] | 104[40] |
| Mixture5 | 396[40] | 268[40] | 120[40] |
| ZLI-5014/000 | 306[50] | 96[45] | 56[52] |

Switching Time/Line; Minimum Time/Line which pixel is changed black to white or white to black.
Driving Voltage; Maximum Voltage contained in voltage waveform applied pixel.

Comparative Examples 9 and 10

Comparative Examples 9 and 10 of the ferroelectric liquid crystal display device was fabricated by using mixture 2 shown in example 2 and PSI-XS014 having a pretilt angle of 3° in the place of PSI-2101 (manufactured by Chisso Petrochemical Corp.) The ferroelectric liquid crystal display device exhibited C2T orientation on the entire surface thereof so that it has an inferior quenching properties.

Besides, when liquid crystal mixture 3 and PSI-XS012 was used, C2T orientation was given.

Thus, when the pretilt angle was 3°, C2U was not given at all in other materials than SCE-8.

Examples 18 and 19

Examples 18 and 19 of the ferroelectric liquid crystal display device was manufactured by using ZLI-4851/000($\Delta\epsilon\approx-0.7$) and 5014/000 ($\Delta\epsilon\approx-0.9$, both manufactured by E Merck) as a ferroelectric material in the place of SCE-8 used in Example 1 and by using PSI-A-X007 (manufactured by Chisso Petrochemical Corp.) having a pretilt angle of 5° in the place of PSI-A-2101 (manufactured by Chisso Chemical Industries, Ltd.) used in Example 1. A unified C2U orientation was given on all the pixels.

Figure 21:
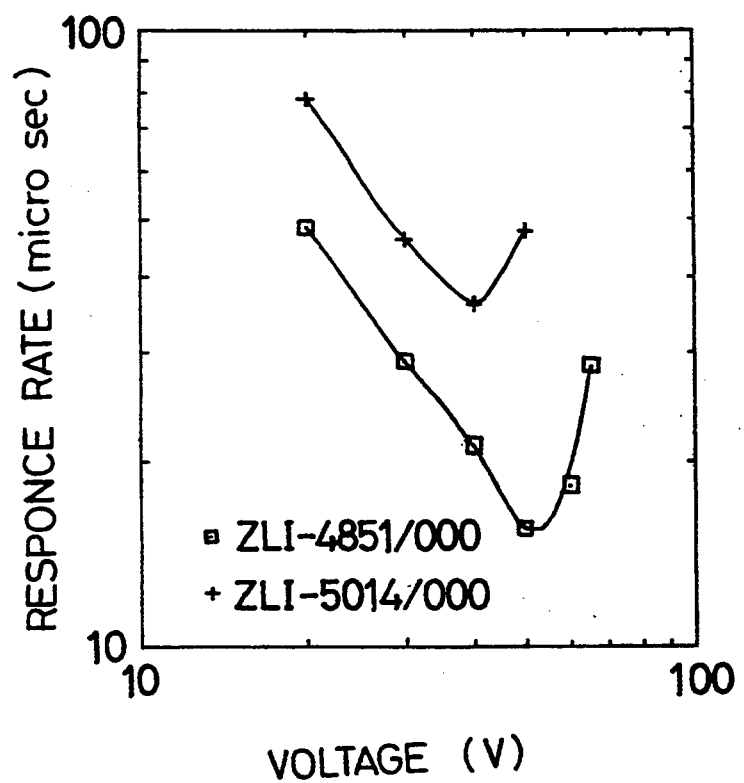
FIG. 21 is a view illustrating the properties of the ferroelectric liquid crystal used in other embodiment of the present invention.

A voltage-response rate relationship in the ferroelectric liquid crystal display device thus manufactured was measured by using the voltage waveform shown in FIG. 7(a). FIG. 21 shows the measurement. As shown in FIG. 21, a voltage (Vmin) was present in the vicinity of 40 to 50 V which minimized the response rate.

Comparative Example 11

Comparative Example 11 of the ferroelectric liquid crystal display device was manufactured by disposing SCE-12 (manufactured by E Merck) into a liquid crystal cell sold on the market (manufactured by E.H.C.

company, cell gap of 2 μm, parallel rubbing) using LX-1400 (manufactured by Hitachi Chemical Industries, Ltd.) having a pretilt angle of 2° as an aligning film. In this ferroelectric liquid crystal display device, C2T orientation is contaminated in C1T orientation. It exhibited an inferior quenching properties and non-unified properties. Incidentally, as shown in Table 3, SCE-12 has an identical value of Δε with SCE-8, but SCE-12 is a ferroelectric liquid crystal mixture having a large spontaneous polarization.

TABLE 3

|  | Transition Temperature | | | | | Spontaneous Polarization |
|---|---|---|---|---|---|---|
|  | C | Sc | Sa | N | I | Δε | ($nC/cm^2$) |
| SCE-8 | ·−20· | 59· | 79· | 100 | −1.8 | +3.2 |
| SCE-12 | ·<−20· | 66· | 81· | 118 | −1.9 | +13.2 |

Figure 19:
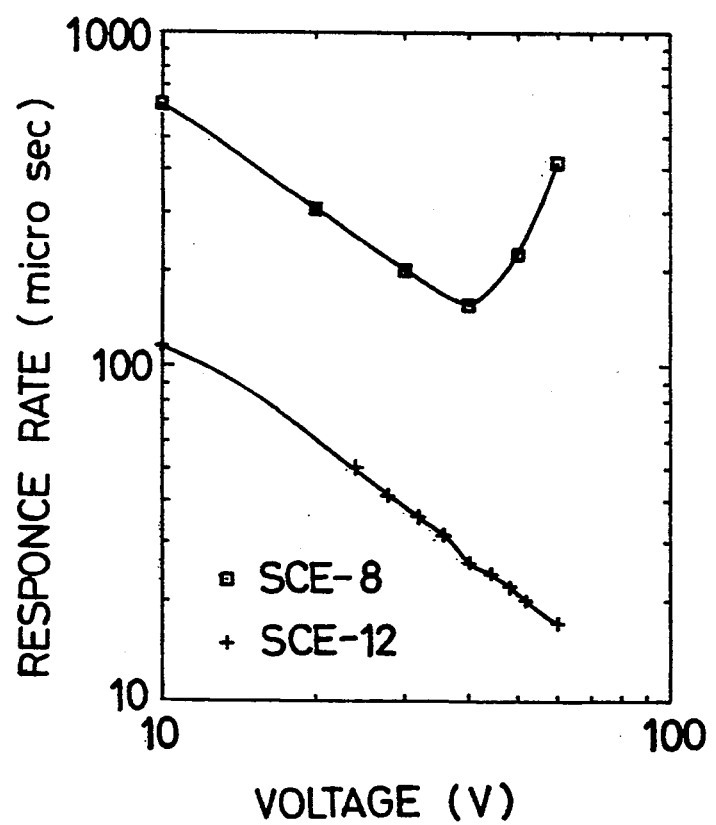
FIG. 19 is a view illustrating the properties of the ferroelectric liquid crystal having $\Delta\epsilon<0$ used in comparative embodiment of the present invention.

A voltage-response rate relationship in the ferroelectric liquid crystal display device thus manufactured was measured by using the voltage waveform shown in FIG. 7(b). FIG. 19 shows the measurement. As shown in FIG. 19, no voltage (Vmin) was present in the scope up to 60 V which minimized the response rate.

The present invention provides a ferroelectric liquid crystal display device that can be driven at a high speed with a high contrast.

When the pretilt angle ranges 5° to 10°, the present invention provides a ferroelectric liquid crystal display device that can offer a unified C2U orientation on all the pixels irrespective of the liquid crystal material.

Further, when the spontaneous polarization is 10 $nC/cm^2$ or less, the present invention provides a ferroelectric liquid crystal display device that can be driven with a low voltage.

What is claimed is:

1. A ferroelectric liquid crystal display device for improving switching time and contrast comprising:
    a first substrate;
    a first electrode laminated on the first substrate;
    a first aligning film laminated on the first electrode, the first aligning film being subjected to a uniaxial orientation treatment;
    a second substrate disposed opposite to the first substrate;
    a second electrode laminated on the second substrate;
    a second aligning film laminated on the second electrode, the second aligning film being subjected to a uniaxial orientation treatment;
    a ferroelectric liquid crystal comprising a smectic liquid crystal disposed between the first and second aligning films; and
    a driving means for driving a pixel:
        wherein the first electrode is part of a plurality of scanning electrodes, the second electrode is part of a plurality of signal electrodes arranged in such a manner that the signal electrodes intersect the scanning electrodes, and a portion of the intersection of the scanning and signal electrodes constitutes the pixel; and
        the driving means applying to the pixel for rewriting the display a rewriting voltage capable of turning on and off the ferroelectric liquid crystal in the minimum time or applying a non-rewriting voltage larger than the rewriting voltage to the pixel, the first and second aligning films having the same pretilt angle with a direction opposite to each other, and the ferroelectric liquid crystal having a dielectric anisotropy of 0 or less and a C2U orientation.

2. A ferroelectric liquid crystal display device of claim 1 wherein the first and the second aligning films both exhibit a pretilt angle of 5° to 10°.

3. A ferroelectric liquid crystal display device of claim 1 wherein the ferroelectric liquid crystal has a dielectric anisotropy of −1 or less.

4. A ferroelectric liquid crystal display device of claim 1 wherein the ferroelectric liquid crystal exhibits a voluntary polarization of 10 $nC/cm^2$ or less.

5. A ferroelectric liquid crystal display device of claim 1 wherein the driving means applies to the pixel a 20% larger voltage for non-rewriting than the voltage for rewriting.

* * * * *